US011832222B2

(12) United States Patent
Yang et al.

(10) Patent No.: US 11,832,222 B2
(45) Date of Patent: Nov. 28, 2023

(54) PARTIAL SYMBOL DESIGN FOR SIDELINK COMMUNICATION

(71) Applicant: QUALCOMM Incorporated, San Diego, CA (US)

(72) Inventors: Wei Yang, San Diego, CA (US); Seyedkianoush Hosseini, San Diego, CA (US); Ahmed Elshafie, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 132 days.

(21) Appl. No.: 17/539,406

(22) Filed: Dec. 1, 2021

(65) Prior Publication Data

US 2023/0171746 A1 Jun. 1, 2023

(51) Int. Cl.
*H04L 27/26* (2006.01)
*H04W 72/04* (2023.01)
*H04W 72/044* (2023.01)

(52) U.S. Cl.
CPC ....... *H04W 72/044* (2013.01); *H04L 27/2607* (2013.01); *H04L 27/2628* (2013.01); *H04L 27/26132* (2021.01)

(58) Field of Classification Search
CPC ........... H04L 27/2607; H04L 27/26132; H04L 27/2628; H04W 72/044
See application file for complete search history.

(56) References Cited

U.S. PATENT DOCUMENTS

| | | | | |
|---|---|---|---|---|
| 2016/0338081 | A1* | 11/2016 | Jiang | H04L 5/0055 |
| 2017/0346543 | A1* | 11/2017 | Islam | H04B 7/0417 |
| 2022/0116254 | A1* | 4/2022 | Wang | H04L 27/26132 |
| 2022/0295464 | A1* | 9/2022 | Ko | H04W 72/044 |

* cited by examiner

*Primary Examiner* — Mohammad S Anwar
*Assistant Examiner* — Natali Pascual Peguero
(74) *Attorney, Agent, or Firm* — Arent Fox, LLP

(57) ABSTRACT

This disclosure provides systems, methods and apparatus, including computer storage media, for sidelink communications using partial symbols to reduce overhead of automatic gain control (AGC) and gaps. A transmitting user equipment (UE) maps a sidelink signal to a subset of resource elements in a frequency domain allocation defined via a comb for a first orthogonal frequency division multiplexing (OFDM) symbol. The transmitting UE performs an inverse discrete Fourier transform (IDFT) on the resource elements to generate a first time domain signal that includes a number of repetitions of a first waveform based on a structure of the comb. The transmitting UE transmits at least one repetition of the first waveform of the first time domain signal during at least a portion of the first OFDM symbol. A receiving UE performs AGC and a discrete Fourier transform on portions of the time domain signal.

30 Claims, 12 Drawing Sheets

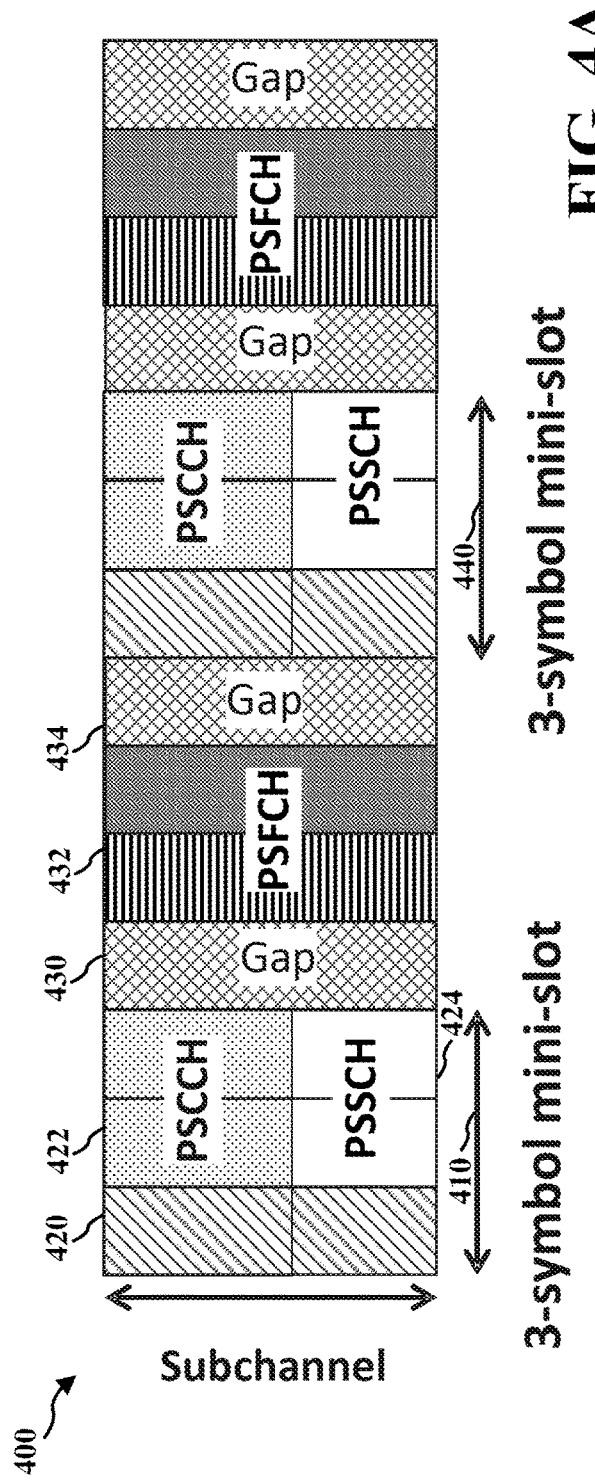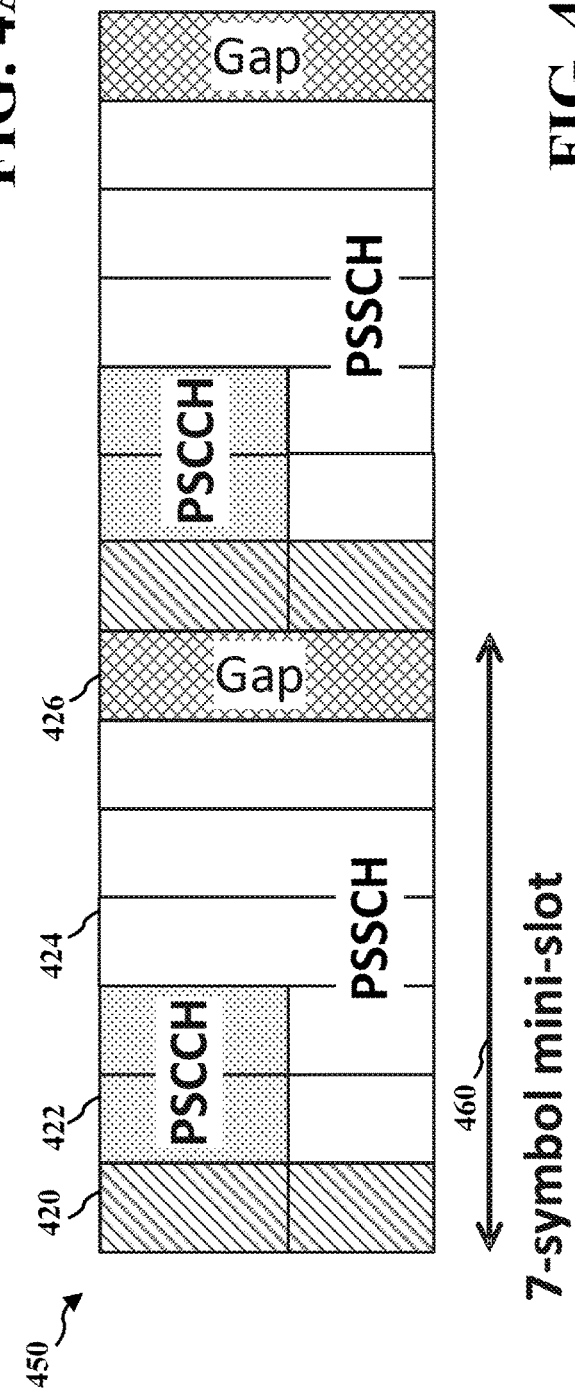
FIG. 4A
FIG. 4B

PARTIAL SYMBOL DESIGN FOR SIDELINK COMMUNICATION

BACKGROUND

Technical Field

The present disclosure relates generally to communication systems, and more particularly, to apparatuses and methods of utilizing a partial symbol design for sidelink communication.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, the disclosure provides a method of wireless communication at a transmitting user equipment (UE). The method includes mapping a sidelink signal to a subset of resource elements in a frequency domain allocation defined via a comb for a first orthogonal frequency division multiplexing (OFDM) symbol. The method includes performing an inverse discrete Fourier transform (IDFT) on the resource elements to generate a first time domain signal. The first time domain signal includes a number of repetitions of a first waveform based on a structure of the comb. The method includes transmitting at least one repetition of the first waveform of the first time domain signal during at least a portion of the first OFDM symbol.

The disclosure also provides an apparatus (e.g., a UE) including a memory storing computer-executable instructions and at least one processor configured to execute the computer-executable instructions to perform the above method, an apparatus including means for performing the above method, and a computer-readable medium storing computer-executable instructions for performing the above method.

In an aspect, the disclosure provides a method of wireless communication at receiving UE. The method includes receiving a first time domain signal for a sidelink signal during at least a portion of a first OFDM symbol. The first time domain signal includes a number of repetitions of a first waveform. The method includes performing automatic gain control on a first repetition of the first waveform. The method includes performing a discrete Fourier transform (DFT) on at least a portion of the first time domain signal. The method includes determining a transmitted signal or a channel from a subset of resource elements output from the DFT for a frequency domain allocation. The subset of resource elements are based on the number of repetitions of the first waveform.

The disclosure also provides an apparatus (e.g., a UE) including a memory storing computer-executable instructions and at least one processor configured to execute the computer-executable instructions to perform the above method, an apparatus including means for performing the above method, and a computer-readable medium storing computer-executable instructions for performing the above method.

Further, a UE may perform the method of transmitting on some OFDM symbols and the method of receiving on other OFDM symbols according to a slot structure.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 4A is a diagram of an example of a sidelink slot structure with a 3-symbol mini-slot.

FIG. 4B is a diagram of an example of a sidelink slot structure with a 7-symbol mini-slot.

DETAILED DESCRIPTION

Figure 1:
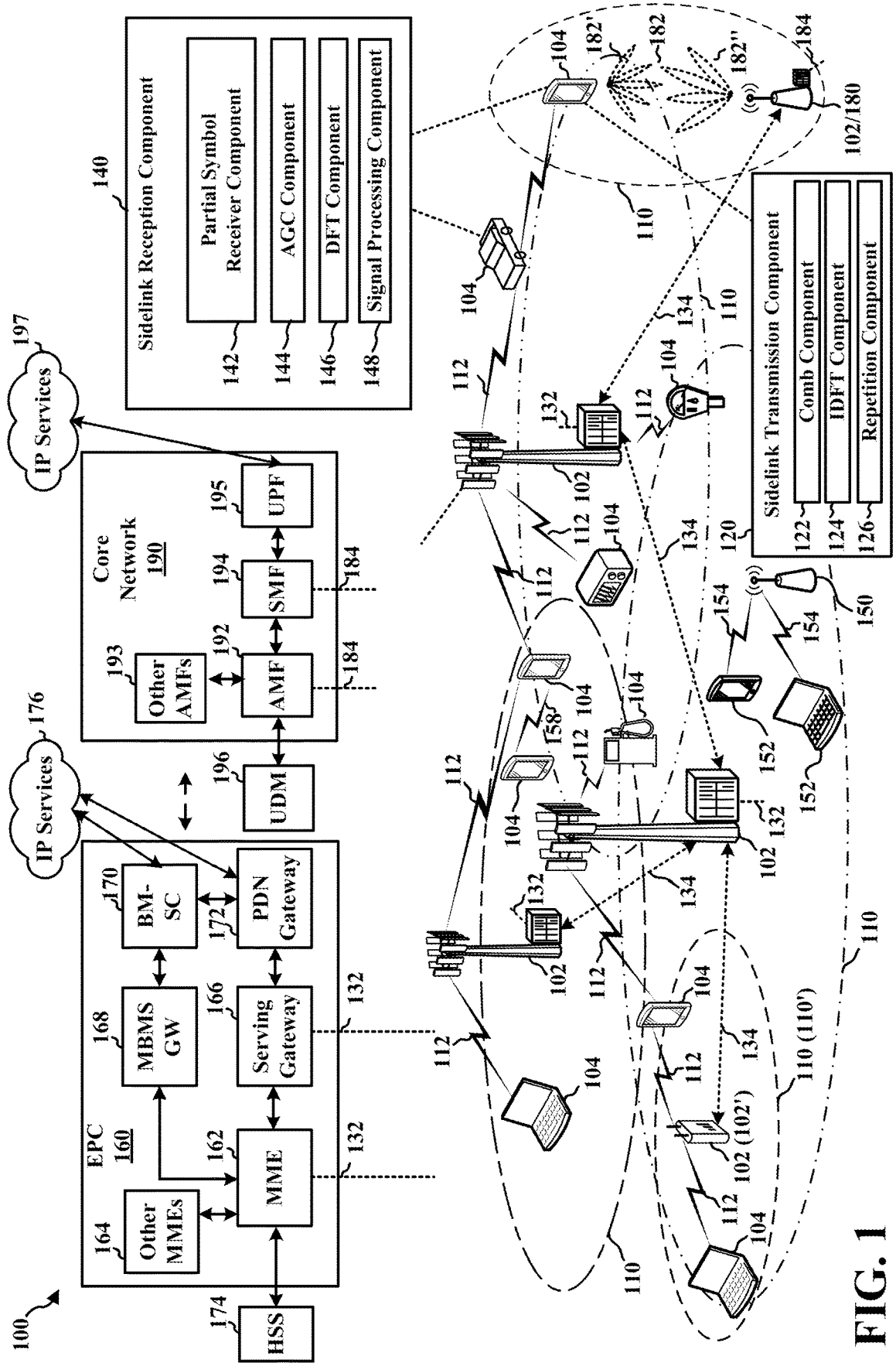
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

A user equipment (UE) may communicate with another wireless communication device via a sidelink, which may also be referred to as direct link communications of device-to-device (D2D) communication technologies. As used herein, a direct link refers to a direct wireless communications path from a first wireless device to a second wireless device. For example, in fifth generation (5G) new radio (NR) communication technologies a direct link between two user equipment (UEs) may be referred to as a sidelink (SL), as opposed to communications over the Uu interface (e.g., from gNB to UE). Direct links may be utilized in D2D communication technologies that can include vehicle-to-vehicle (V2V) communications, vehicle-to-infrastructure (V2I) communications (e.g., from a vehicle-based communication device to road infrastructure nodes), vehicle-to-network (V2N) communications (e.g., from a vehicle-based communication device to one or more network nodes, such as a base station), a combination thereof and/or with other devices, which can be collectively referred to as vehicle-to-anything (V2X) communications. In V2X communications, vehicle-based communication devices can communicate with one another and/or with infrastructure devices over a direct link channel.

Like other wireless communication technologies, sidelink communications may utilize a frame structure that includes sub-frames and slots. Sidelink communications may utilize orthogonal frequency domain multiplexing (OFDM). Resources for sidelink communications include subcarriers in the frequency domain and OFDM symbols in the time domain. The combination of a subcarrier and OFDM symbol may be referred to as a resource element (RE). Conventional sidelink slot structures allocate resources at the level of an OFDM symbol to various signals (e.g., reference signals), channels, and overhead processing. For example, overhead processing may include automatic gain control (AGC) performed on a first OFDM symbol of a slot and gap symbols where the slot structure changes direction (e.g., a switch from transmitting to receiving).

In some scenarios, a shorter slot structure may be desirable, for example, to reduce latency. With a reduced the number of symbols in a slot, a receiving device may sooner provide feedback indicating whether a sidelink transmission was received. With shorter slot structures, however, the resources used for overhead processing such as AGC and gaps may become relatively large compared to the resources (e.g., symbols) for carrying signals.

In an aspect, the present disclosure provides for a partial symbol design for sidelink communications. A transmitting device may generate time domain signals that repeat during an OFDM symbol. The repeated pattern of the time domain signal may allow a receiving device to perform processing such as AGC on a first portion of the symbol (e.g., a first repetition) and receive a signal on a second portion of the signal (e.g., a subsequent repetition). Similarly, where a gap is needed, the transmitting device may insert a gap during a first portion of the symbol and the receiving device may receive the signal (e.g., a subsequent repetition) during a second portion of the symbol. The transmitting device may generate the repetitions by allocating sidelink signals to frequency domain resources via a comb structure and applying an inverse discrete Fourier transform (IDFT). The time domain signal output from the IDFT will include repetitions of a waveform. A cyclic prefix (CP) may be inserted at the front of the time domain signal and serve as a CP for any repetition of the waveform. Accordingly, the basic OFDM signal processing and numerology does not change when generating the repetitions. On the receiver side, a single repetition of the waveform may processed for channel estimation and/or decoding. The repetition of the waveform may be duplicated to allow processing with the same discrete Fourier transform (DFT) as other symbols or a different DFT may be used for partial symbols.

Particular implementations of the subject matter described in this disclosure can be implemented to realize one or more of the following potential advantages. Use of partial symbols may reduce the proportion of resources for overhead, thereby increasing efficiency of resource utilization. In some cases, multiple UEs may multiplex signals on partial symbols to improve resource utilization.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. Non-transitory computer-readable media excludes transitory signals. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

In an aspect, one or more of the UEs 104 may include a sidelink transmission component 120 configured to transmit a sidelink signal having at least one repetition of a waveform during at least a portion of an OFDM symbol. The sidelink transmission component 120 may include a comb component 122 configured to map a sidelink signal to a subset of resource elements in a frequency domain allocation defined via a comb for a first OFDM symbol. The sidelink transmission component 120 may include an IDFT component 124 configured to perform an IDFT on the resource elements to generate a first time domain signal. The first time domain signal includes a number of repetitions of a first waveform based on a structure of the comb. The sidelink transmission component 120 may include a repetition component 126 configured to transmit at least one repetition of the first waveform of the first time domain signal during at least a portion of the first OFDM symbol.

In an aspect, one or more of the UEs 104 may include a sidelink reception component 140 configured to receive sidelink communications including at least a portion of a symbol including a repetition of a waveform. The sidelink reception component 140 may include a partial symbol receiver component 142 configured to receive a first time domain signal for a sidelink signal during at least a portion of a first OFDM symbol. The first time domain signal includes a number of repetitions of a first waveform. The sidelink reception component 140 may include an AGC component 144 configured to perform automatic gain control on a first repetition of the first waveform. The sidelink reception component 140 may include a DFT component 146 configured to perform a DFT on at least a portion of the first time domain signal. The sidelink reception component 140 may include a signal processing component 148 configured to determine a transmitted signal or a channel from a subset of resource elements output from the DFT for a frequency domain allocation. The subset of resource elements is based on the number of repetitions of the first waveform.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface), which may be wired or wireless. The base stations 102 configured for 5G NR (collectively referred to as Next Generation RAN (NG-RAN)) may interface with core network 190 through second backhaul links 184, which may be wired or wireless. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 112 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 112 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the following description may be focused on 5G NR, the concepts described herein may be applicable to other similar areas, such as LTE, LTE-A, CDMA, GSM, and other wireless technologies.

Figure 2:
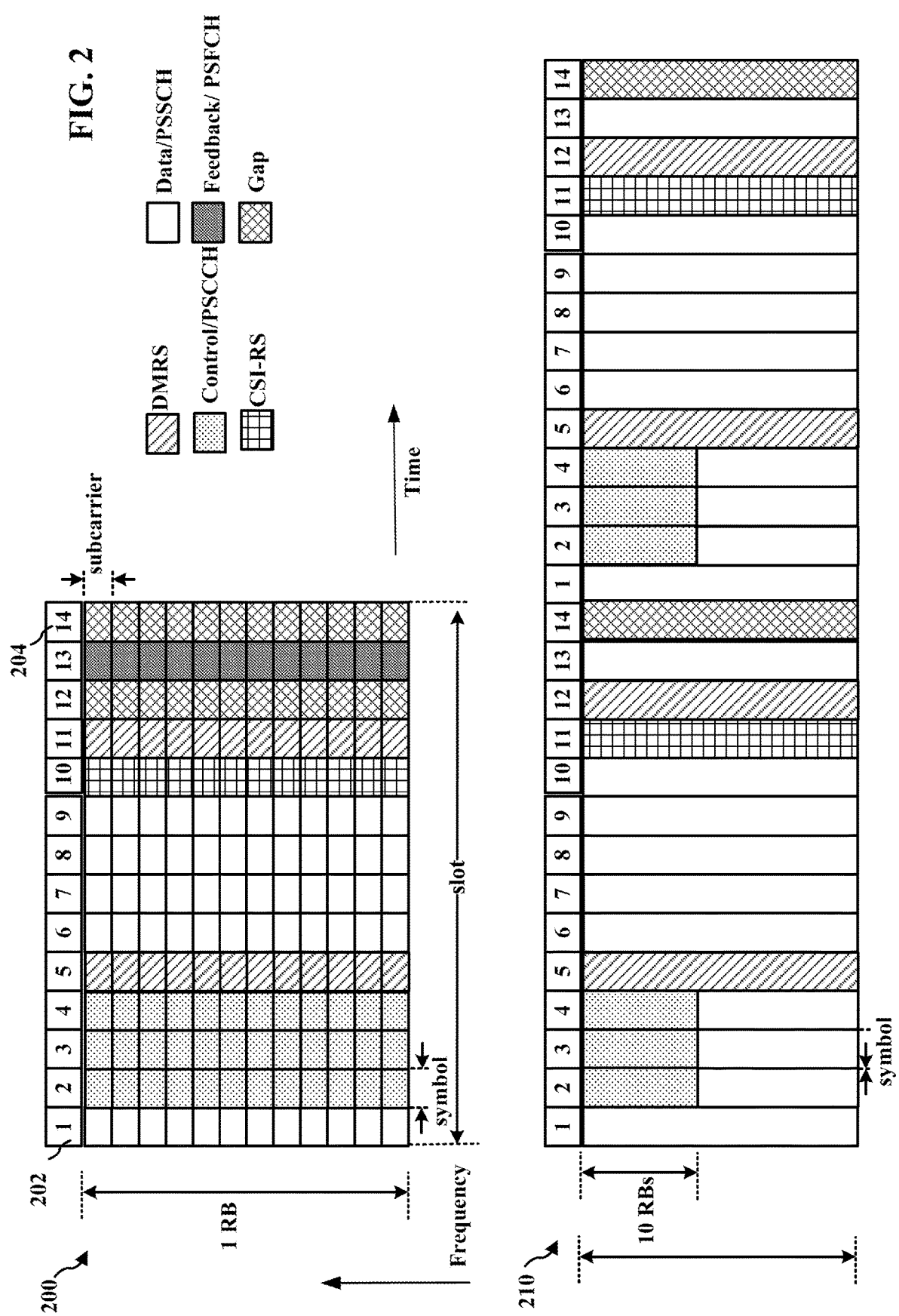
FIG. 2 illustrates an example of a sidelink slot structure.

FIG. 2 illustrates example diagrams 200 and 210 illustrating example slot structures that may be used for wireless communication between UEs 104, e.g., for sidelink communication. The slot structure may be within a 5G NR frame structure. Although the following description may be focused on 5G NR, the concepts described herein may be applicable to other similar areas, such as LTE, LTE-A, CDMA, GSM, and other wireless technologies. This is merely one example, and other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 200 illustrates a single slot transmission, e.g., which may correspond to a 0.5 ms transmission time interval (TTI). Diagram 210 illustrates multiple slots and RBs. Diagram 200 illustrates a single RB, whereas diagram 210 illustrates N RBs. In diagram 210, 10 RBs being used for control is merely one example. The number of RBs may differ.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may include control information, e.g., a physical sidelink control channel (PSCCH) along with demodulation RS (DMRS). The control information may include Sidelink Control Information (SCI). The SCI may reserve resources for data, e.g., a physical sidelink shared channel (PSSCH). In NR, PSCCH and PSSCH may be time domain multiplexed. The first symbol 202 in the slot may be for automatic gain control (AGC) for pre-processing the control and/or data information and/or to normalize the incoming signal power. The last symbol 204 may be a gap symbol or guard symbol. At least one symbol may be used for feedback such as a physical sidelink feedback channel (PSFCH). A symbol prior to and/or after the feedback may be used for turnaround between reception of data and transmission of the feedback. For example, symbol 12 may be a gap symbol to enable turnaround for feedback in symbol 13. In some implementations, another symbol, e.g., symbol 11 may be used as a gap with a two symbol PSFCH. The gap enables a device to switch from operating as a transmitting device to prepare to operate as a receiving device, e.g., in the following slot. With a two symbol PSFCH, a receiving device may perform AGC on the first symbol. The position of any of the SCI, data, and feedback symbols may be different than the example illustrated in FIG. 2.

FIG. 2 also illustrates that symbol(s) may include CSI-RS. The symbols in FIG. 2 that are indicated for DMRS or CSI-RS indicate that the symbol comprises DMRS or CSI-RS REs. Such symbols may also include REs that include data. For example, if a number of ports for DMRS or CSI-RS is 1 and a comb-2 pattern is used for DMRS/CSI-RS, then half of the REs may comprise the RS and the other half of the REs may comprise data. A CSI-RS resource may start at any symbol of a slot, and may occupy 1, 2, or 4 symbols depending on a configured number of ports. CSI-RS can be periodic, semi-persistent, or aperiodic (e.g., based on DCI triggering). For time/frequency tracking, CSI-RS may be either periodic or aperiodic. CSI-RS may be transmitted in bursts of two or four symbols that are spread across one or two slots.

An example of sidelink communication may include cellular vehicle to everything (CV2X) applications. To receive sidelink packets, the receiver (RX) may perform blind decoding in some or all sub-channels. The number of sub-channels may range from, e.g., 1-27 channels. PSCCH and PSSCH may be transmitted within a same slot. PSSCH may occupy up to $N_{subchannel}^{SL}$ contiguous sub-channels. PSCCH may occupy one sub-channel with the lowest sub-channel index. The first-stage SCI (SCI-1) may be transmitted in PSCCH containing information about PSSCH bandwidth and resource reservation in future slots. The second-stage SCI (SCI-2) may be found and decoded after decoding PSCCH. The source identification (ID) and/or destination ID may be used to identify the transmitting UE and the receiving UE of the packet, respectively. The size of the sub-channels in vehicle to everything (V2X) may be 10 or more resource blocks (RBs). In CV2X, the UEs may decode all transmissions and blind decode all sub-channels.

Figure 3:
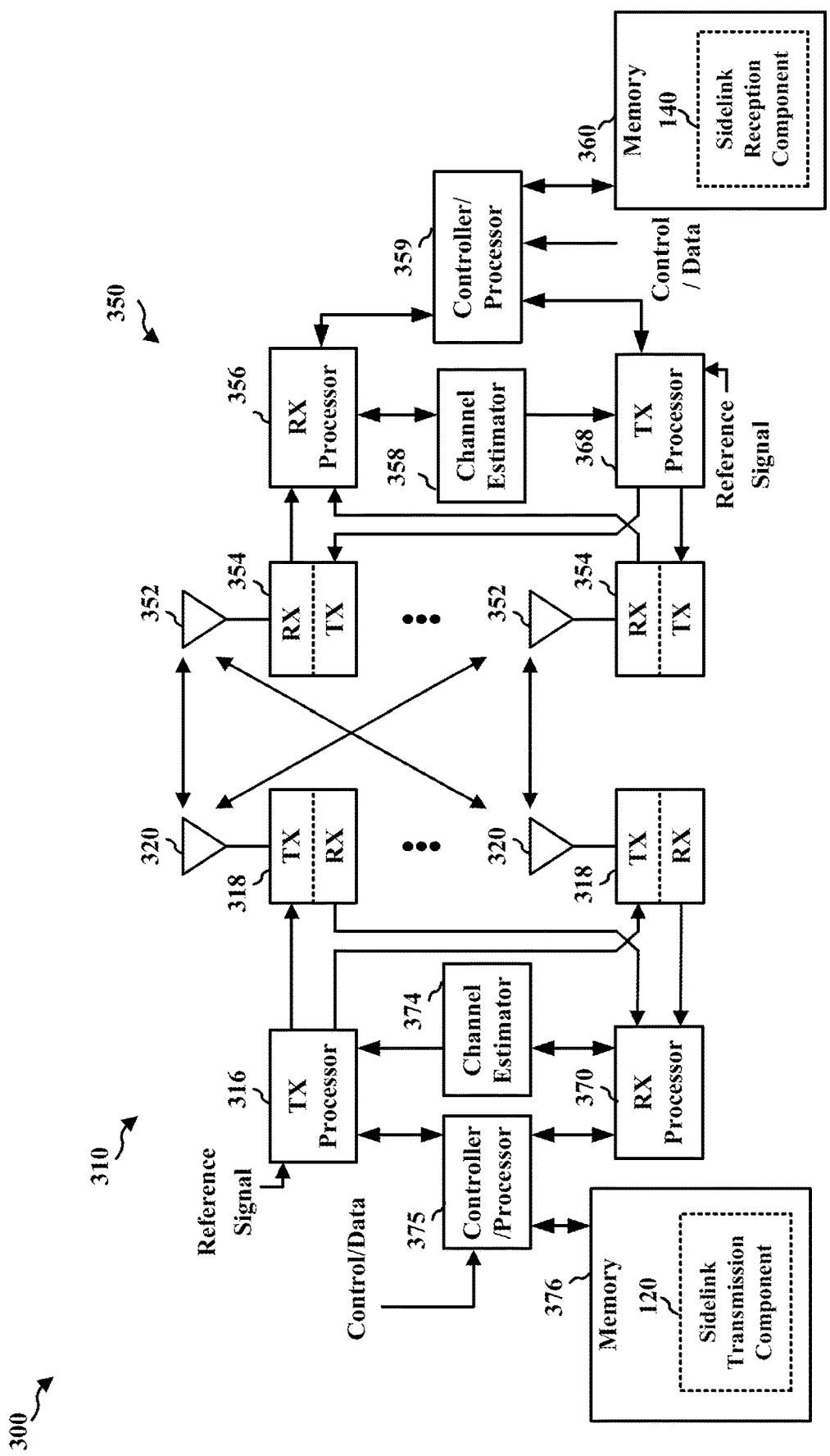
FIG. 3 is a diagram illustrating an example of a first wireless communication device in communication with a second wireless communication device.

FIG. 3 is a block diagram 300 of a first wireless communication device 310 in communication with a second wireless communication device 350, e.g., via V2V/V2X/D2D communication. The device 310 may comprise a transmitting device communicating with a receiving device, e.g., device 350, via V2V/V2X/D2D communication. The communication may be based, e.g., on sidelink. The transmitting device 310 may comprise a UE, an RSU, etc. The receiving device may comprise a UE, an RSU, etc. Packets may be provided to a controller/processor 375 that implements layer 3 and layer 2 functionality. Layer 3 includes a RRC layer, and layer 2 includes a packet data convergence protocol (PDCP) layer, a radio link control (RLC) layer, and a medium access control (MAC) layer.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) or an Inverse Discrete Fourier Transform (IDFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318TX. Each transmitter 318TX may modulate an RF carrier with a respective spatial stream for transmission.

At the device 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT) or a discrete Fourier transform (DFT). The frequency domain signal comprises a separate OFDM symbol stream for each subcarrier of the OFDM signal. The symbols on each subcarrier, and the reference signal, are recovered and demodulated by determining the most likely signal constellation points transmitted by device 310. These soft decisions may be based on channel estimates computed by the channel estimator 358. The soft decisions are then decoded and deinterleaved to recover the data and control signals that were originally transmitted by device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

At least one of the TX processor 316, the RX processor 370, and the controller/processor 375 may be configured to perform aspects in connection with the sidelink transmission component 120 of FIG. 1.

At least one of the TX processor 368, the RX processor 356, and the controller/processor 359 may be configured to perform aspects in connection with the sidelink reception component 140 of FIG. 1.

FIG. 4A is a diagram of an example of a sidelink slot structure 400 with a 3-symbol mini-slot 410. Sidelink communication may be used to support ultra-reliable low-latency (URLLC) application. To facilitate URLLC, the slot structure may be reduced to a mini-slot or sub-slot where there may be more than one mini-slot or sub-slot in one slot and PSSCH/PSCCH is confined within a sub-slot. For example, in the example sidelink slot structure 400, the mini-slot 410 may include a first symbol 420 for AGC, and PSCCH 422 and PSSCH 424 on the second and third symbols. The mini-slot 410 may be followed by a gap symbol 430, two-symbol PSFCH 432, and gap symbol 434. The gap symbol 430 may allow the transmitting device to switch directions to receive the PSFCH. A first symbol of the PSFCH 432 may be used for AGC. The gap symbol 434 may allow the transmitting device to switch back to transmitting. A second mini-slot 440 may follow the same pattern as the mini-slot 410 on the second half of the slot. Accordingly, the slot structure 400 may allow two transmissions with feedback within a slot.

FIG. 4B is a diagram of an example of a sidelink slot structure 450 with a 7-symbol mini-slot 460. The mini-slot 460 may include a first symbol 420 for AGC. Five additional symbols may be allocated for PSCCH 422 and PSSCH 424. For instance, the PSCCH 422 may be on the first three symbols including symbol 420 for AGC and the PSSCH 424 may be on the first six symbols including the symbol 420 for AGC. The seventh symbol may be for a gap 426. The mini-slot 460 may be repeated on the second half of the sidelink slot structure 450. In some implementations, the direction of transmission may change in the gap 426 such that a transmitting device during the first half of the sidelink slot structure 450 receives during the second half of the sidelink slot structure.

With either of the sidelink slot structures 400 or 450, the amount of overhead symbols may increase relative to the data/control symbols. For example, in the sidelink slot structure 400, eight of the fourteen symbols may be used for either AGC or a gap. In the sidelink slot structure 450, four of the fourteen symbols may be used for either AGC or a gap. Accordingly, as the slot duration becomes shorter, the relative increase in the AGC and gap overhead may limit the spectral efficiency.

Figure 5A:
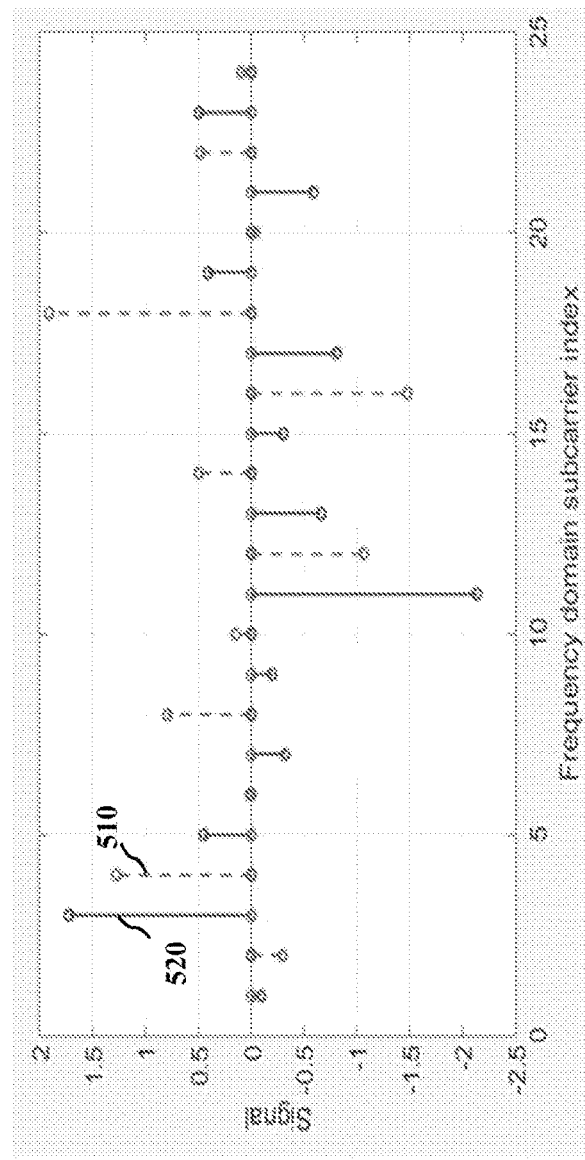
FIG. 5A is a diagram of example frequency domain signals with a comb structure.

FIG. 5A is a diagram 500 of example frequency domain signals 510, 520 with a comb structure. In an aspect, a comb structure may be used to generate time domain signals with a repeated waveform that allows for partial symbol processing related to AGC and/or gaps. The partial symbol processing may reduce the amount of AGC or gap overhead and improve spectral efficiency for sidelink communications.

The comb structure may allocate sidelink signals to a subset of subcarriers or tones within a frequency domain allocation. For a single OFDM symbol in the time domain, the comb may allocate the sidelink signal to a subset of resource elements (REs). For example, a comb-2 structure may allocate a signal to every other RE within the frequency domain allocation. For a comb-2 structure in frequency (e.g., every other tone/subcarrier being set to zero), the signals may be [x,x] and [y,−y], depending on whether the signal is transmitted on the odd subcarriers or on the even subcarriers. More generally, a comb-K structure may allocate the signal to every $K^{th}$ RE/tone/subcarrier. A comb-K structure will result in a time domain signal with K repetitions (K repeated waveforms). As illustrated, the frequency domain signal 510 may be allocated to the even subcarriers and the frequency domain signal 520 may be allocated to the odd subcarriers.

Figure 5B:
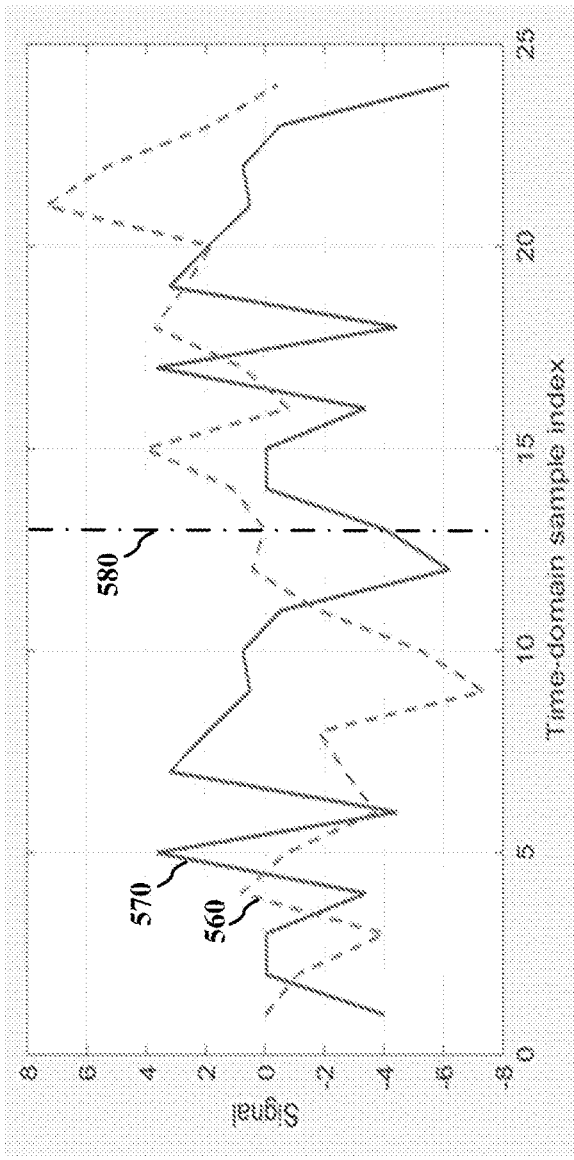
FIG. 5B is a diagram of example time domain signals corresponding to the frequency domain signals of FIG. 5A.

FIG. 5B is a diagram 550 of example time domain signals 560 and 570 corresponding to the frequency domain signals 510 and 520 of FIG. 5A. The time domain signal 560 may correspond to the frequency domain signal 510 on the even subcarriers. The time domain signal 570 may correspond to the frequency domain signal 520 on the odd subcarriers. The time domain signals 560 and 570 may be generated from the corresponding frequency domain signals 510 and 520 via an inverse discrete Fourier transform (IDFT) or inverse fast Fourier transform (IFFT). The time domain signals 560 and 570 may include repetition of a waveform. For example, waveform for the time domain signal 560 may occur before a half-symbol time 580. The second half of the time domain signal 560 may be an inverted repetition of the first half of the time domain signal 560. Similarly, for the time domain signal 570, the waveform before the half-symbol time 580 may be repeated on the second half of the symbol.

In an aspect, the repetition properties of DFT/FFT may be leveraged to support partial symbol AGC, gap, and/or signal transmission. For example, if an OFDM symbol of PSSCH/PSFCH/PSCCH are constrained to only occupy half of the tones in the frequency domain using comb-2, the OFDM symbol will have a repetition structure in the time domain, where the first half OFDM symbol is a repetition of the second half of the OFDM symbol. The receiving device may use the first half symbol as AGC and the second half symbol as signal. This way, the receiving device achieves a half symbol AGC followed by a half symbol signal. Similarly, the first repetition can be used as gap, and be skipped by the transmitting device. The transmitting device can transmit only the second half of the symbol. Accordingly, the time domain signal can have a half-symbol gap follow by a half symbol AGC or signal. Because the gap portion contains a repetition of the signal, no information is lost when the transmitter skips the first repetition for use as a gap. The concept of partial symbols using repetitions in time can be generalized to more than two repetitions using a comb with K greater than two.

Figure 6:
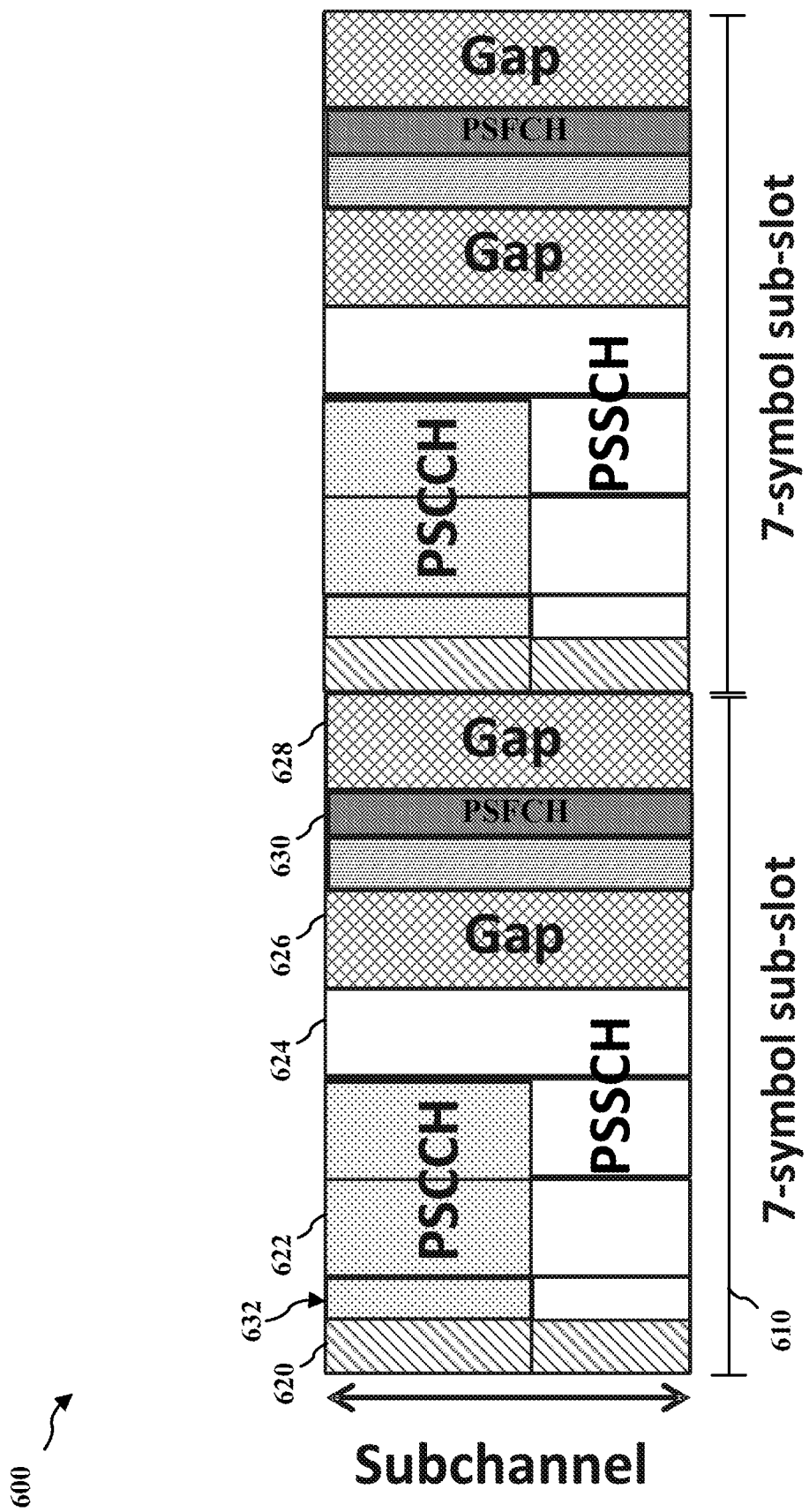
FIG. 6 is a diagram of an example sidelink slot structure with half-symbol automatic gain control (AGC).

FIG. 6 is a diagram of an example sidelink slot structure 600 with half-symbol automatic gain control (AGC). The slot structure 600 may include two seven symbol sub-slots 610. Each sub-slot 610 may include a first symbol 620 with a repeated waveform (e.g., time domain signal 560 or 570). In some implementations, for PSCCH/PSSCH, the first half symbol 632 may only include the DMRS, which has comb 2 structure (in particular, only the first comb is used. The PSCCH 622 may be present on the first three symbols and the PSSCH 624 may be present on the first four symbols. Gaps 626 and 628 may occur on the fifth and seventh symbols of the sub-slot 610. The gaps 626 and 628 may allow the transmitting device and the receiving device to switch direction between the PSSCH 624 and the PSFCH 630. The PSFCH 630 may be transmitted in the sixth symbol. The PSFCH 630 may also use a repeated waveform (e.g., time domain signal 560 or 570). The PSFCH channel becomes half symbol long, which is a simple repetition of the AGC. Accordingly, a receiving device may perform AGC on the first half of the sixth symbol and receive the PSFCH 630 on the second half of the sixth symbol. In some implementations, the PSFCH channel can be one and a half (1.5) symbols long, and the AGC plus PSFCH may have the same length (2 symbols) as in slot structure 400 (FIG. 4A), but the coverage of PSFCH may be improved by 50% compared to the PSFCH in the slot structure 400 (e.g., because only one symbol is used for PSFCH 432 in slot structure 400).

The slot structure 600 may reduce overhead for AGC. For example, a total of one symbol per sub-slot may be used for AGC. Total overhead for the slot structure 600 including ACG and gaps may be six symbols versus the eight symbols in slot structure 400. This may represent a 33% resource increase compared to the baseline design.

Figure 7:
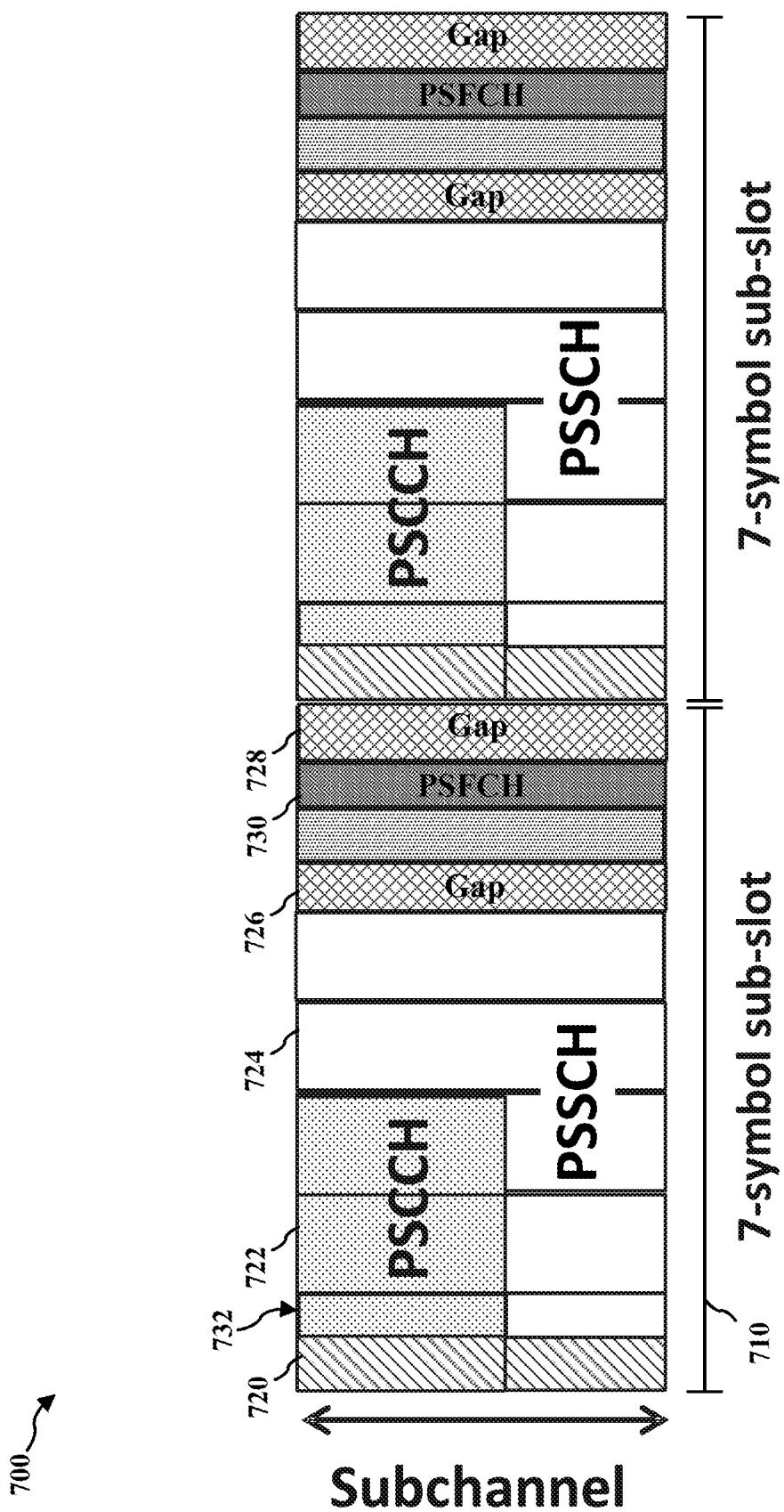
FIG. 7 is a diagram of an example sidelink slot structure with half-symbol AGC and gaps.

FIG. 7 is a diagram of an example sidelink slot structure 700 with half-symbol AGC and gaps. The slot structure 700 may include two seven symbol sub-slots 710. Each sub-slot 710 may include a first symbol 720 with a repeated waveform (e.g., time domain signal 560 or 570) in the same manner as in the slot structure 600 of FIG. 6. Accordingly, AGC may be performed on the first half-symbol, and the half-symbol 732 may carry DMRS or PSCCH/PSSCH. The PSCCH 722 may be present on the first four symbols and the PSSCH 724 may be present on the first five symbols. The sidelink slot structure 700 may utilize half-symbol gaps 726 and 728 with a one symbol PSFCH 730 spanning the sixth and seventh symbols. That is, the one symbol PSFCH 730 will span the second half of the sixth OFDM symbol and the first half of the seventh OFDM symbol of the sub-slot 710. The half-symbol gaps 726 and 728 may allow the transmitting device and the receiving device to switch direction between the PSSCH 724 and the PSFCH 730.

The PSFCH 730 may also use a repeated waveform (e.g., time domain signal 560 or 570). In some implementations, to generate the repeated waveform for the PSFCH 730, the transmitting device may generate the same PSFCH signal in both the sixth and seventh symbols using a comb. For example, four repetitions may be generated across the two symbols. The transmitting device may zero out the first half of the sixth symbol to generate the gap 726 and zero out the second half of the seventh symbol to generate the gap 728. In some other implementations, the transmitting device may generate a single symbol of PSFCH using a comb to generate the repeated waveform and delay the time domain signal by a half-symbol to create gaps 726 and 728. In either case, the receiving device may utilize the second half of the sixth symbol for AGC and receive the PSFCH 730 in the first half of the seventh symbol. In some implementations, the transmitting device may increase the transmission power of the portion of a symbol that is transmitted with a half-symbol gap. For example, the transmitting device may double the transmission power of the half-symbol PSFCH 730 in the sixth symbol with the half-symbol gap 726 such that the total power for the sixth symbol is equal to a full symbol PSFCH. Similarly, in the seventh slot with the half-symbol PSFCH 730 and the half-symbol gap 728, the transmitting device may double the power of the half-symbol PSFCH. The slot structure 700 may reduce overhead for AGC and gaps. For example, a total of one symbol per sub-slot 710 may be used for AGC and one symbols for gaps. Total overhead for the slot structure 600 including AGC and gaps may be five symbols versus the eight symbols in slot structure 400. This may represent a 66% resource increase compared to the baseline slot structure 400.

Figure 8:
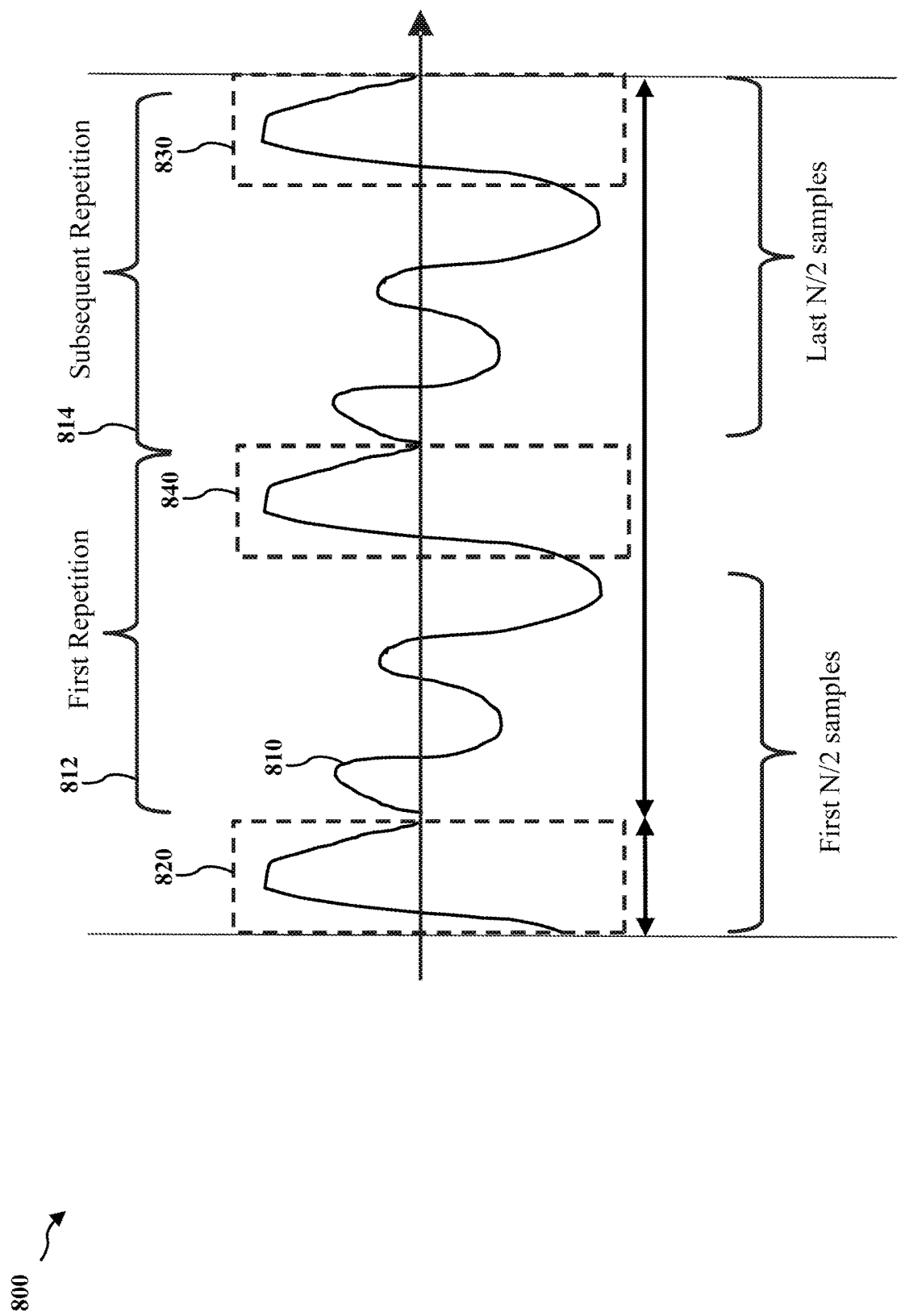
FIG. 8 is a diagram of an example time domain signal with repetition and a cyclic prefix.

FIG. 8 is a diagram 800 of an example time domain signal 810 with repetition and a cyclic prefix (CP) 820. For example, the time domain signal 810 may include a first repetition 812 and a subsequent repetition 814 of the same waveform. The CP 820 may be inserted at the beginning of the time domain signal 810 as in conventional OFDM transmissions. For example, a tail portion 830 of the time domain signal 810 may be copied to the front of the time domain signal 810 as the CP 820. Because of the repetition structure, there may be effective CP samples 840 in the middle of the OFDM symbol, which can be used by the receiving device to perform OFDM processing. In some implementations, the CP samples 840 may be present with the comb that corresponds to [+1, +1] repetition (e.g., even subcarriers). The middle samples using the other comb may be partially inverted. Accordingly, in some implementations, where the tone index starts from zero, the comb that includes the even tone indices may be preferable. If the tone index starts from 1, then the odd tones may be preferable.

In an aspect, a receiving device with size N DFT may process N samples for a symbol, but the transmitting device may transmit N+$N_{CP}$ samples. In theory, the receiving device may use the first N/2 time-domain samples for AGC, and use the remaining part of the OFDM symbol (e.g., the N/2+$N_{CP}$ samples) for signal processing (e.g., channel estimation and/or data decoding). In some implementations, the receiving device may use fewer than N/2 samples or greater than N/2 samples for AGC processing, for example, based on tradeoff between AGC accuracy and data channel quality and power.

Similarly, for symbols that include a half-symbol gap and half-symbol signal or AGC, a similar approach may be used to generate a time domain signal, and the gaps may be created by zeroing out the first half or the second half of the symbol. More specifically, the gap can be of length N/2 samples, which can include the first N/2 samples or the last N/2 samples of the OFDM symbol, which is slightly shorter than one half of the OFDM symbol of length N+$N_{CP}$. If the first N/2 samples are removed due to the gap, the remaining portion of the OFDM symbol still has a CP portion (e.g., CP samples 840), which is of length $N_{CP}$. Similarly, if the last N/2 samples are removed for a gap, then the first portion of the OFDM symbol contains CP (e.g., CP 820) as well.

The examples of half-symbols using a comb-2 structure can be extended to partial symbols of length 1/K using a comb-K structure. In some implementations, the most useful cases of K may be values of 3, 4, 6, or 12, which are evenly divisible by the number (12) of subcarriers in a resource block (RB). For generality, the length of the ACG can be m/K, where m is a natural number less than K. That is, the AGC can have a fractional length between 1/K OFDM symbols and (K−1)/K OFDM symbols.

In some implementations, there can be more than one UE to be orthogonally multiplexed on the same partial OFDM symbol and same RB, where different UEs can be assigned different time-domain orthogonal cover codes (OCCs). The time domain OCCs may be multiplied to the time-domain repetitions (each of length 1/K OFDM symbol). Multiplexing may be useful for PSFCH transmission or for DMRS transmission (e.g., with front-loaded DMRS for PSCCH/PSSCH).

For example, in the case where K is 4, the time domain OCC [1, 1, 1, 1] creates a comb-4 signal that only occupies the first tone of every four tones. On the other hand, the time-domain OCC [1, −1, −1, 1] corresponds to a comb-2 signal that occupies the 2nd and 4th tone of every 4 tones. The two UEs that use [1, 1, 1, 1] and [1, −1, −1, 1] have signals that are orthogonal to each other, even after removing the AGC portion of the symbol. Accordingly, the orthogonality allows the signals to be multiplexed. For instance, the PSFCH transmissions from different sidelink UEs may be separated.

As another example, the time-domain OCC [1, −1, −1, 1] can be used on the DMRS symbol to create a comb-2 structure in frequency domain output from the FFT. This structure can be better for time-domain channel estimation than the OCC [1, 1, 1, 1]. Generally, the length-K OCCs may have the same value in the first and last position, e.g., [1, x, . . . , x, 1] in order to preserve the CP structure (i.e., the end of the first repetition is equal to the CP, which is taken from the end of the last repetition, which implies the first repetition and last repetition are equal). This structure maintains orthogonality of the signals of different UEs after removing the first 1/K portion of the OFDM symbol.

Where partial-symbol transmission is used for PSFCH, the PSFCH resource may be determined based at least in part on a comb index such as an OCC. Conventionally, a PSFCH resource may be determined based on a sub-channel index of the PSSCH and a source/destination ID. For example, the UE may allocate $[(i+j \cdot N_{PSSCH}^{PSFCH} \cdot M_{subch,slot}^{PSFCH}, (i+1+j \cdot N_{PSSCH}^{PSFCH}) \cdot M_{subch,slot}^{PSFCH} - 1]$ PRBs from $M_{PRB,set}^{PSFCH}$ PRBs to slot i and subchannel j, where $0 \le i \le N_{PSSCH}^{PSFCH}$ and $0 \le j \le N_{subch}$.

For example, where the PSFCH periodicity, $N_{PSSCH}^{PSFCH}$ is 4, and the number of subchannels, $N_{subch}$ is 10, $M_{subch,slot}^{PSFCH}$ may be equal to 2, which implies 80 PRBs for PSFCH. In this example, each sub-channel is associated with 2 PSFCH PRBs, each PRB has k cyclic shifts, and each PSFCH is sent on one PRB using one cyclic shift according to the index. Slot i may be equal to the source ID plus destination ID mod 2k for managed-group cast or slot i may be equal to source ID mod 2k for unicast.

For partial symbols PSFCH, the set of PSFCH resources may be indexed by 1) PRB index (in case the set of RBs includes M*K RBs), 2) cyclic shift index, and 3) OCC/comb index. The above equation can be reused to determine the OCC/comb index. For example, for K=4, each sub-channel j and slot i may be mapped to a set of 4 RBs. Two OCCs and two cyclic shifts can be supported on the 4 RBs. Thus, the index may be the source ID mod (2*2), which can be used to determine the unique OCC index (between 0 and 1) and CS index (between 0 and 1) associated with the PSFCH resource.

Figure 9:
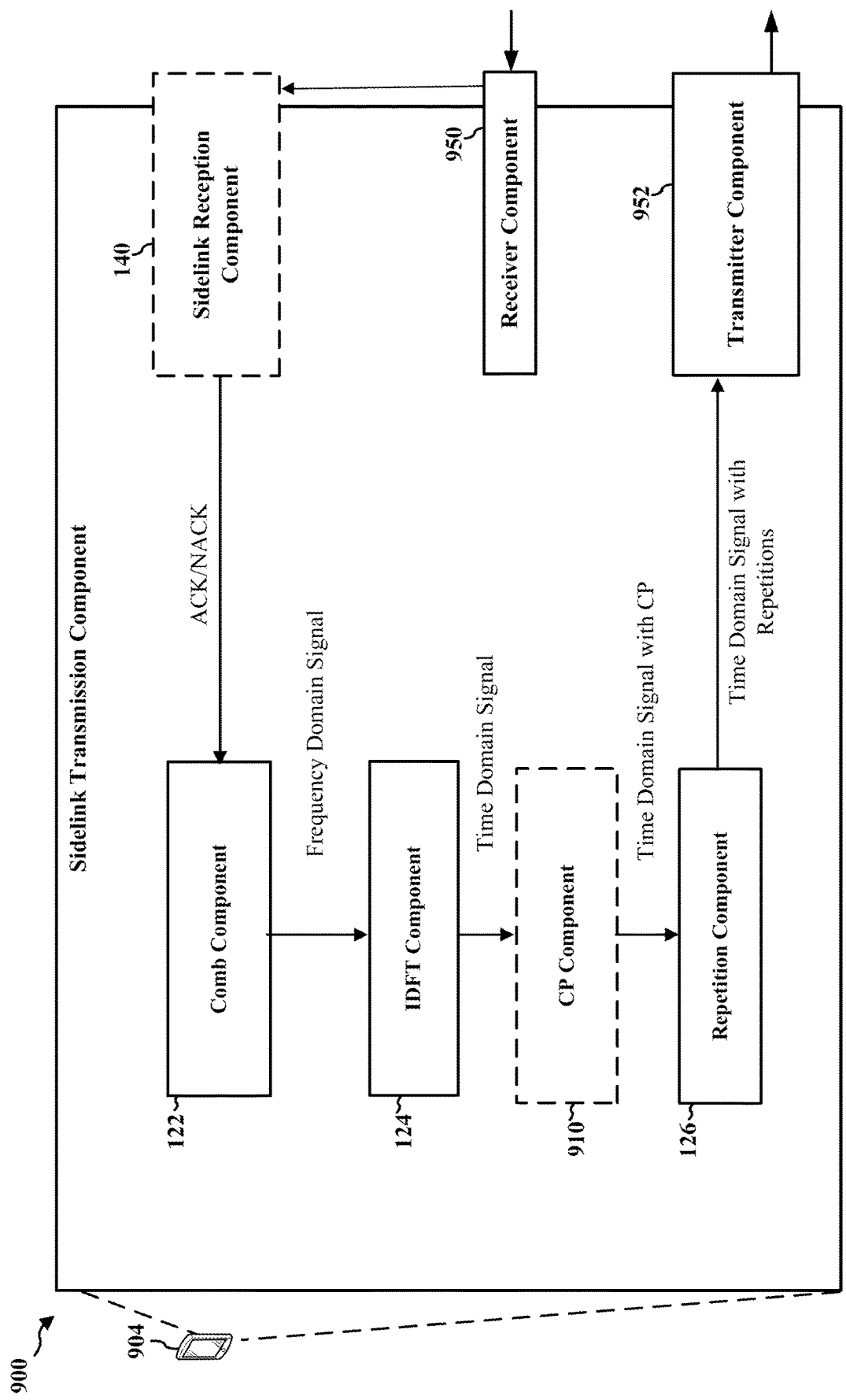
FIG. 9 is a conceptual data flow diagram illustrating the data flow between different means/components in an example transmitting UE for sidelink communications.

FIG. 9 is a conceptual data flow diagram 900 illustrating the data flow between different means/components in an example transmitting UE 904, which may be an example of a UE 104 including the sidelink transmission component 120.

The transmitting UE 904 may include a receiver component 950, which may include, for example, a radio frequency (RF) receiver for receiving the signals described herein. The UE 904 may include a transmitter component 952, which may include, for example, an RF transmitter for transmitting the signals described herein. In an aspect, the receiver component 950 and the transmitter component 952 may be co-located in a transceiver such as illustrated by the TX/RX 318 in FIG. 3.

As discussed with respect to FIG. 1, the sidelink transmission component 120 may include the comb component 122, the IDFT component 124, and the repetition component 126. The sidelink transmission component 120 may optionally include a CP component 910.

The receiver component 950 may receive sidelink signals such as a PSCCH, PSSCH, or PSFCH. In some implementations, the transmitting UE 904 may include the sidelink reception component 140. The receiver component 950 may pass the received sidelink signals to the sidelink reception component.

The comb component 122 may be configured to map a sidelink signal to a subset of resource elements in a frequency domain allocation defined via a comb for a first OFDM symbol. The comb component 122 may receive the sidelink signal from a higher layer component (not shown) or the sidelink reception component 140. For example, the sidelink reception component 140 may provide an ACK or NACK status for transmission on a PSFCH. In an aspect, the sidelink signal may be a PSCCH, PSSCH, PSFCH, or DMRS. The comb component may map the sidelink signal to a subset of resource elements for the configured frequency domain allocation based on the structure of the comb. For example, the comb may be comb-2, or more generally comb-K. In some implementations, the comb may be configured for UE multiplexing. For example, the comb may be selected according to a comb index or OCC index. The comb component 122 may pass a frequency domain signal to the IDFT component 124.

The IDFT component 124 may be configured to perform an IDFT on the resource elements to generate a first time domain signal. The IDFT component 124 may receive the frequency domain signal including the resource elements from the comb component 122. The IDFT component 124 may perform the IDFT based on a size (e.g., number of subcarriers) in the frequency domain allocation. That is, even though the comb component 122 may generate a frequency domain signal including resource elements for only a subset of the subcarriers in the frequency domain allocation, the IDFT may be the full size for the frequency domain allocation. Accordingly, the time domain signal 810 generated by the IDFT may include a number of repetitions 812, 814 of a first waveform based on a structure of the comb. For example, the number of repetitions may be equal to K for a comb-K structure. The IDFT component 124 may provide the time domain signal 810 to the CP component 910 or directly to the repetition component 126.

The CP component 910 may be configured to insert a CP into a time domain signal. The CP component 910 may receive the time domain signal from the IDFT component. As illustrated above in FIG. 8, the CP component 910 may generate the CP 820 based on the tail portion 830 of the time domain signal 810. That is, the CP component 910 may copy the tail portion 830 to the front of the time domain signal 810. The CP samples 840 may occur automatically based on the repetition structure of the time domain signal 810. The CP component 910 may pass the time domain signal to the repetition component 126.

The repetition component 126 may be configured to transmit at least one repetition of the first waveform of the first time domain signal during at least a portion of the first OFDM symbol. The repetition component 126 may receive the time domain signal from the CP component 910 or directly from the IDFT component 124. The repetition component 126 may transmit the time domain signal via the transmitter component 952. In some implementations, the repetition component 126 may transmit at least a second OFDM symbol for the sidelink signal. The second OFDM symbol may not include repetition. For example, the sidelink signal for the second OFDM symbol may bypass the comb component 122 such that the IDFT component 124 outputs a time domain signal without repetition. In some implementations, where a portion of the first symbol is to be used for a gap such as gaps 726 or 728, the repetition component 126 may create the gap. For example, in some implementations, the repetition component 126 may transmit at least one repetition of the waveform outside of the gap portion of the symbol and zero out a portion of the time domain signal during the gap portion. In some other implementations, the repetition component 126 may delay the time domain signal including repetitions by the duration of the gap 726. Accordingly, a first portion of the time domain signal (e.g., a first repetition of the waveform) may be transmitted in the first OFDM symbol after the gap 726, and a second portion of the time domain signal may be transmitted in the subsequent OFDM symbol. The repetition component 126 may stop transmitting during the gap 728.

Figure 10:
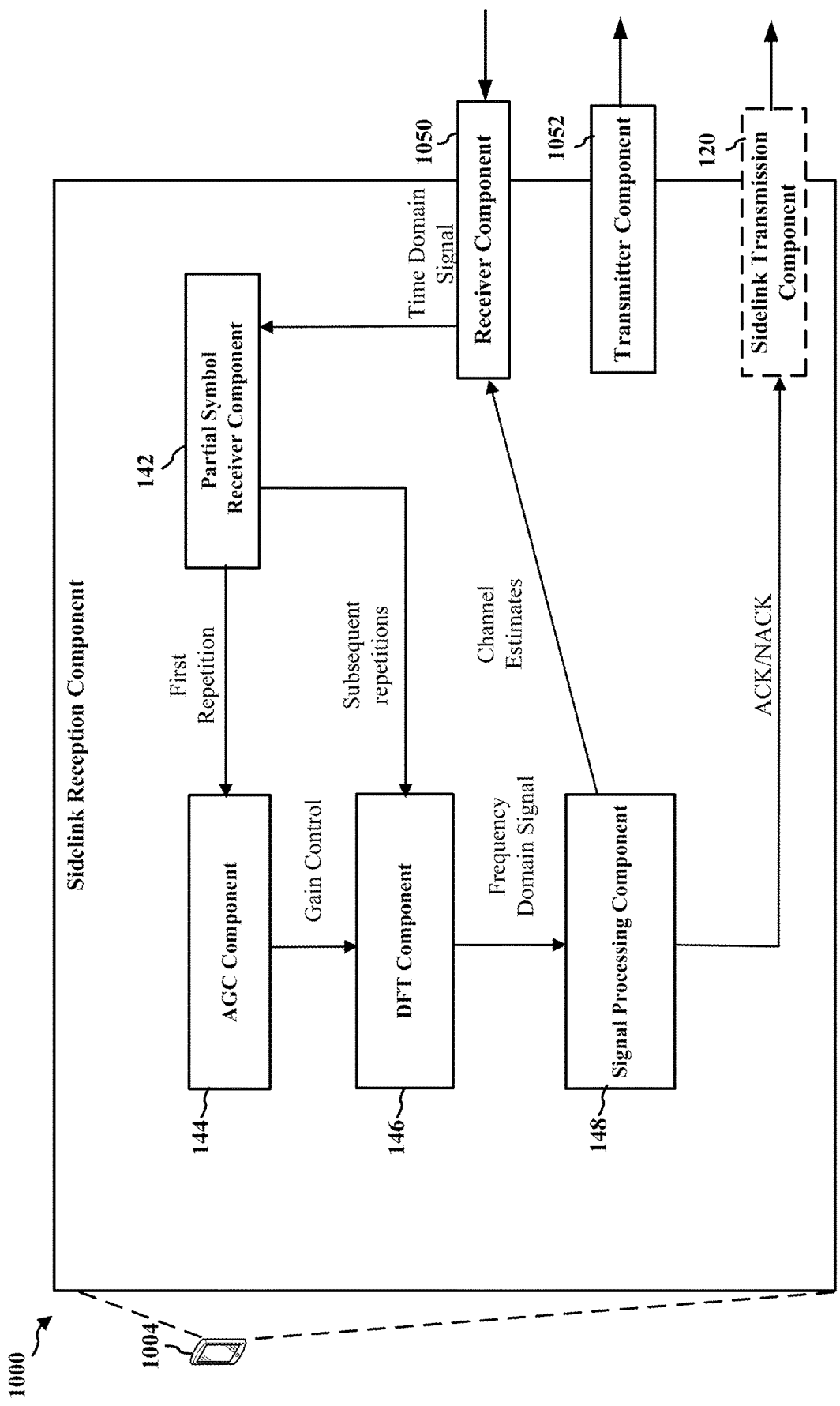
FIG. 10 is a conceptual data flow diagram illustrating the data flow between different means/components in an example receiving UE for sidelink communications.

FIG. 10 is a conceptual data flow diagram 1000 illustrating the data flow between different means/components in an example receiving UE 1004, which may be an example of the UE 104 including the sidelink reception component 140. Further, it should be understood that a UE 104 may include both the sidelink transmission component 120 and the sidelink reception component 140. The UE 104 may operate as a transmitting UE 904 or a receiving UE 1004 depending on the direction of transmission for a particular sidelink signal.

The receiving UE 104 may include a receiver component 1050, which may include, for example, a RF receiver for receiving the signals described herein. The receiving UE 104 may include a transmitter component 1052, which may include, for example, an RF transmitter for transmitting the signals described herein. In an aspect, the receiver component 1050 and the transmitter component 1052 may co-located in a transceiver such as the TX/RX 354 in FIG. 3.

As discussed with respect to FIG. 1, the sidelink reception component 140 may include the partial symbol receiver component 142, the AGC component 144, the DFT component 146, and the signal processing component 148.

The receiver component 1050 may receive sidelink signals according to a slot structure such as the slot structure 600 or slot structure 700. The received signal during an OFDM signal may be a time domain signal. The receiver component 1050 may pass the received time domain signal to the partial symbol receiver component 142 for OFDM symbols configured for partial symbol signals. The receiver component 1050 may pass time domain signals for symbols configured for full symbol signals directly to the DFT component 146.

The partial symbol receiver component 142 may be configured to receive a first time domain signal for a sidelink signal during at least a portion of a first OFDM symbol. The partial symbol receiver component 142 may receive the first time domain signal from the receiver component 950. The first time domain signal 810 may include a number of repetitions 812, 814 of a first waveform. For example, the number of repetitions may be at least two and may be represented as K. The partial symbol receiver component 142 may identify a first repetition 812 of the first waveform. For example, the first repetition 812 may include N/K samples, where N is a number of samples within an OFDM symbol or a number of samples for a DFT. Where the time domain signal 810 includes a CP 820, the first repetition 812 may include symbols from the CP 820. The partial symbol receiver component 142 may pass the first repetition 812 to the AGC component 144. The partial symbol receiver component 142 may pass the subsequent repetition 814 to the DFT component 146.

The AGC component 144 may be configured to perform automatic gain control on the first repetition 812 of the first waveform. The automatic gain control may stabilize a signal amplitude of received signals. In an aspect, because the first repetition 812 of the first waveform is the same as the subsequent repetitions 814 of the first waveform, the AGC may benefit from repetition of the waveform in the same manner as in slot structures 400 and 450 where an entire symbol is repeated and used for AGC. The repetition of the waveform within the symbol may reduce the overhead of the AGC. The AGC component 144 may provide gain control for the subsequent repetitions 814.

The DFT component 146 may be configured to perform a DFT on at least a portion of the second time domain signal. The DFT component 146 may receive the subsequent repetitions 814 of the first waveform from the partial symbol receiver component 142. The DFT component 146 may apply the samples of the subsequent repetitions to a DFT. In some implementations, the DFT may have a size of N, but the subsequent repetitions 814 may include fewer than N samples (e.g., because the first repetition of the first waveform is not included). In some implementations, the DFT component 146 may duplicate a portion of the first time domain signal 810. For example, where a portion of the time domain signal includes a gap portion, the DFT component 146 may duplicate the first repetition of the waveform to fill the gap portion of the symbol. Accordingly, the DFT component 146 may utilize a DFT of size N. The frequency domain signal output by the DFT component 146 may have a comb structure (e.g., only values on every $K^{th}$ resource element). In some other implementations, the DFT component 146 may adjust a size of the DFT based on the number of repetitions of the time domain signal. For example, the DFT component 146 may utilize a DFT of size N/K, which is equal to the number of samples in the repeated waveform. The frequency domain signal output from the DFT component 146 may include X/K resource elements, where X is a number of subcarriers in the frequency domain allocation. The DFT component 146 may provide the frequency domain signal to the signal processing component 148.

The signal processing component 148 may be configured to determine a transmitted signal or a channel from a subset of resource elements output from the DFT for a frequency domain allocation. For example, the signal processing component 148 may perform channel estimation and/or decoding based on the frequency domain signal. For instance, if the frequency domain signal corresponds to a DMRS, the signal processing component 148 may estimate the channel, and the channel estimate may be used for subsequent symbols. If the frequency domain signal corresponds to a PSFCH, PSCCH, or PSSCH, the signal processing component 148 may decode the channel according to a coding and modulation scheme for the corresponding channel. Where the frequency domain signal corresponds to the PSFCH with comb based multiplexing, the signal processing component 148 may separate UEs according to an index of PSFCH resources that is based at least in part on a comb index. For example, the signal processing component 148 may determine an association between PSSCH and PSCCH resources and a PSFCH resource based on the comb index. The signal processing component 148 may provide channel estimates to the receiver component 1050. The signal processing component 148 may provide decoded signals to another component. For example, the signal processing component 148 may provide an ACK or NACK status of a received PSSCH to the sidelink transmission component 120 for transmission on the PSFCH.

Figure 11:
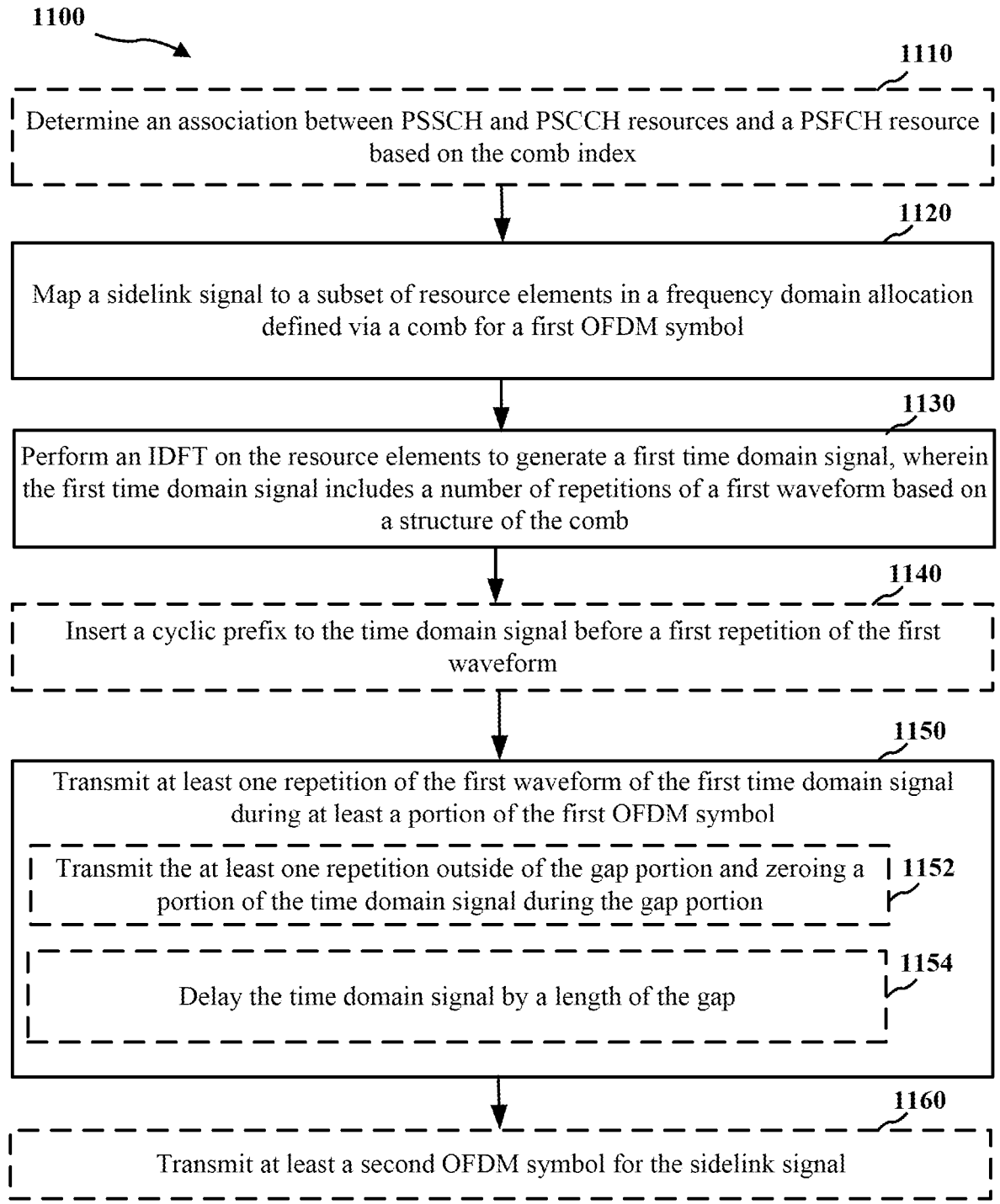
FIG. 11 is a flowchart of an example of a method of transmitting a sidelink communication using partial symbols.

FIG. 11 is a flowchart of an example method 1100 for operating a UE 104 as a transmitting UE 904 for sidelink transmission using partial symbols. The method 1100 may be performed by a UE (which may correspond to the UE 104 or a transmitting UE 904) which may include the memory 376 and which may be the UE 104 or a component of the UE 104 such as the sidelink transmission component 120, TX processor 316, the RX processor 370, or the controller/processor 375. The method 1100 may be performed by the UE 104 in communication with the sidelink reception component 140 of a receiving UE 1004.

At block 1110, the method 1100 may optionally include determining an association between PSSCH and PSCCH resources and a PSFCH resource based on a comb index. In an aspect, for example, the UE 104, the TX processor 316 and/or the controller/processor 375 may execute the sidelink transmission component 120 and/or the repetition component 126 to determine an association between PSSCH and PSCCH resources (e.g., for PSCCH 722 and PSSCH 724) and a PSFCH resource (e.g., for PSFCH 730) based on the comb index. For instance, the comb index may identify a comb or OCC assigned to the UE 104. The repetition component 126 may determine the PSFCH resource based on 1) PRB index of the PSCCH/PSSCH, 2) cyclic shift index, and 3) OCC/comb index. Accordingly, the UE 104, the TX processor 316, and/or the controller/processor 375 executing the sidelink transmission component 120 and/or the repetition component 126 may provide means for determining an association between PSSCH and PSCCH resources and a PSFCH resource based on the comb index.

At block 1120, the method 1100 includes mapping a sidelink signal to a subset of resource elements in a frequency domain allocation defined via a comb for a first OFDM symbol. In an aspect, for example, the UE 104, the TX processor 316 and/or the controller/processor 375 may execute the sidelink transmission component 120 and/or the comb component 122 to map a sidelink signal (e.g., DMRS, PSCCH, PSSCH, or PSFCH) to a subset of resource elements in a frequency domain allocation defined via a comb for a first OFDM symbol. In some implementations, the comb has a comb-2 structure that allocates the sidelink signal to every other resource element. In some implementation, the comb allocates the sidelink signal to every $K^{th}$ resource element, where K is greater than 2. Accordingly, the UE 104, the TX processor 316, and/or the controller/processor 375 executing the sidelink transmission component 120 and/or the comb component 122 may provide means for mapping a sidelink signal to a subset of resource elements in a frequency domain allocation defined via a comb for a first OFDM symbol.

At block 1130, the method 1100 includes performing an IDFT on the resource elements to generate a first time domain signal. In an aspect, for example, the UE 104, the TX processor 316 and/or the controller/processor 375 may execute the sidelink transmission component 120 and/or the IDFT component 124 to perform an IDFT on the resource elements to generate a first time domain signal 810. The first time domain signal 810 includes a number of repetitions of a first waveform based on a structure of the comb. Accordingly, the UE 104, the TX processor 316, and/or the controller/processor 375 executing the sidelink transmission component 120 and/or the IDFT component 124 may provide means for performing an IDFT on the resource elements to generate a first time domain signal.

At block 1140, the method 1100 may optionally include inserting a cyclic prefix to the time domain signal before a first repetition of the first waveform. In an aspect, for example, the UE 104, the TX processor 316 and/or the controller/processor 375 may execute the sidelink transmission component 120 and/or the CP component 910 to insert a cyclic prefix 820 to the time domain signal 810 before a first repetition of the first waveform. Accordingly, the UE 104, the TX processor 316, and/or the controller/processor 375 executing the sidelink transmission component 120 and/or the CP component 910 may provide means for inserting a cyclic prefix to the time domain signal before a first repetition of the first waveform.

At block 1150, the method 1100 includes transmitting at least one repetition of the first waveform of the first time domain signal during at least a portion of the first OFDM symbol. In an aspect, for example, the UE 104, the TX processor 316 and/or the controller/processor 375 may execute the sidelink transmission component 120 and/or the repetition component 126 to transmit at least one repetition of the first waveform of the first time domain signal during at least a portion of the first OFDM symbol. In some implementations, a first repetition of the first waveform is for AGC and one or more subsequent repetitions of the first waveform during the first OFDM symbol are for the sidelink signal. For example, the one or more subsequent repetitions of the first waveform may carry a DMRS to be used for channel estimation. In some implementations, the symbol includes a gap portion. The repetition component 126 may not transmit a repetition of the first waveform during the gap portion. In some implementations, at sub-block 1152, the block 1150 may optionally include transmitting the at least one repetition outside of the gap portion and zeroing a portion of the time domain signal during the gap portion. In some implementations, at sub-block 1154, the block 1150 may optionally include delaying the time domain signal by a length of the gap portion. In some implementations, the block 1150 may optionally include increasing a transmission power of the at least one repetition of the first waveform based on a total transmission power allowed for the first OFDM symbol. For example, the transmission power of the at least one repetition of the first waveform may be doubled for a half-symbol waveform such that the at least one repetition has the same transmission power as a full-symbol waveform. Accordingly, the UE 104, the TX processor 316, and/or the controller/processor 375 executing the sidelink transmission component 120 and/or the repetition component 126 may provide means for transmitting at least one repetition of the first waveform of the first time domain signal during at least a portion of the first OFDM symbol.

At block 1160, the method 1100 may optionally include transmitting at least a second OFDM symbol for the sidelink signal. In an aspect, for example, the UE 104, the TX processor 316 and/or the controller/processor 375 may execute the sidelink transmission component 120 and/or the repetition component 126 to transmit at least a second OFDM symbol for the sidelink signal. In some implementations, the second OFDM signal may be for the same physical channel(s) as the first OFDM symbol. For example, both the first OFDM symbol and the second OFDM symbol may be for PSFCH. Accordingly, the PSFCH may utilize one and a half symbols, which may provide greater coverage than the slot structure 400 where a two symbol PSFCH 432 only utilizes one symbol because the first symbol is used for AGC. Similarly, when the second OFDM symbol is used for PSCCH and/or PSSCH a greater number of symbols may carry the respective channel. Accordingly, the UE 104, the TX processor 316, and/or the controller/processor 375 executing the sidelink transmission component 120 and/or the repetition component 126 may provide means for transmitting at least a second OFDM symbol for the sidelink signal.

In some implementations, the method 1100 may include performing the method 1200 on a second OFDM symbol. For example, a transmitting UE 904 may perform the method 1100 on a first symbol of the slot structure 600 or 700 that includes PSCCH/PSSCH, then perform the method 1200 on a sixth symbol of the slot structure 600 or 700 that includes PSFCH.

Figure 12:
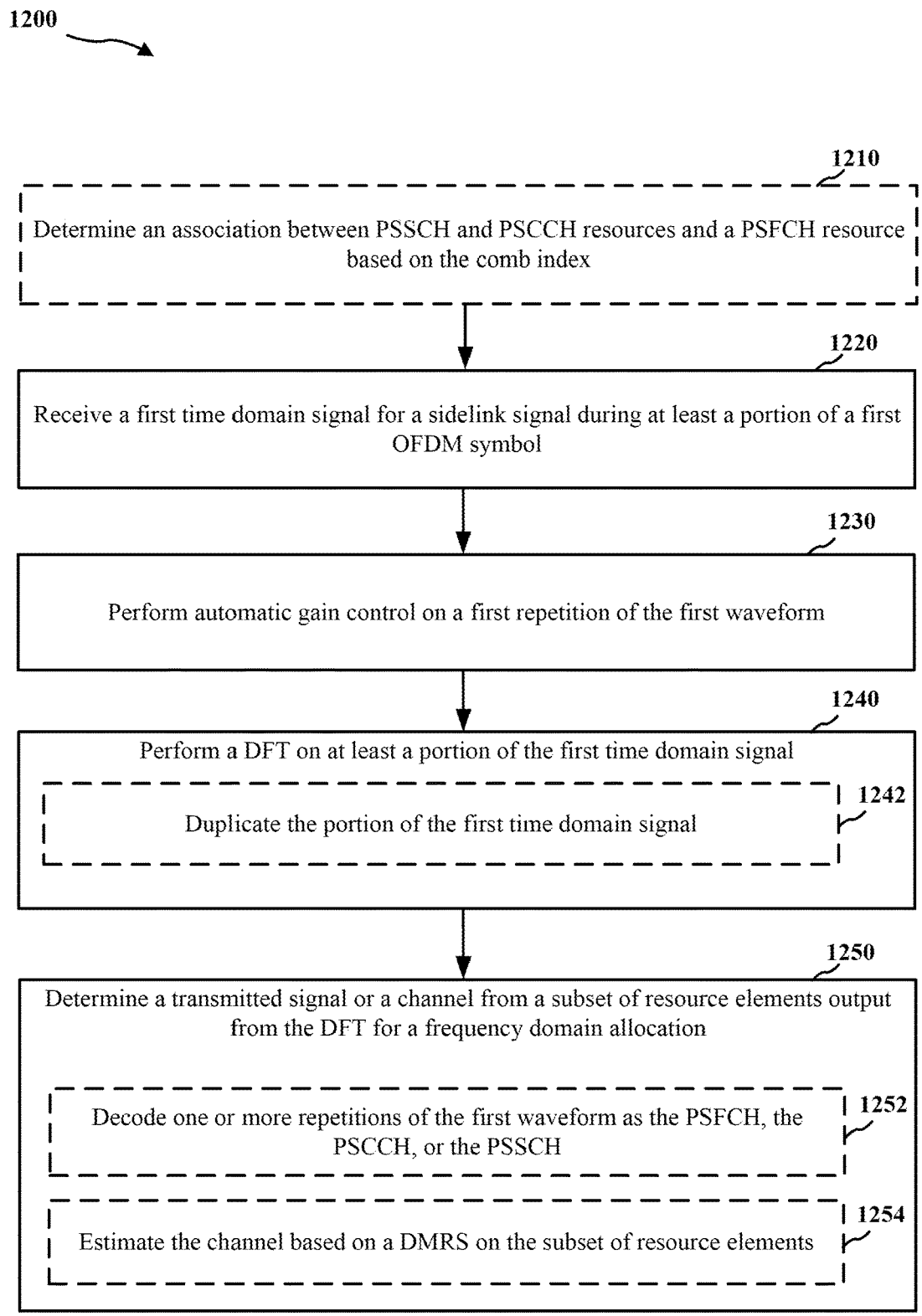
FIG. 12 is a flowchart of an example of a method of receiving a sidelink communication using partial symbols.

FIG. 12 is a flowchart of an example method 1200 for operating a receiving UE (e.g., UE 1004 for sidelink reception with partial symbols. The method 1200 may be performed by a UE (such as the UE 104, which may include the memory 360 and which may be the entire UE 104 or a component of the UE 104 such as the sidelink reception component 140, TX processor 368, the RX processor 356, or the controller/processor 359). The method 1200 may be performed by the sidelink reception component 140 in communication with the sidelink transmission component 120. The method 1200 may be performed in conjunction with the method 1100. For example, a transmitting UE 904 may perform the method 1100 while a receiving UE 1004 performs the method 1200. The transmitting UE 904 may then switch roles and perform the method 1200.

At block 1210, the method 1200 may optionally include determining an association between PSSCH and PSCCH resources and a PSFCH resource based on the comb index. In an aspect, for example, the UE 104, the RX processor 356 and/or the controller/processor 359 may execute the sidelink reception component 140 and/or the signal processing component 148 to determine an association between PSSCH and PSCCH resources and a PSFCH resource based on the comb index. For instance, the comb index may identify a comb or OCC assigned to a UE transmitting a PSFCH. The signal processing component 148 may determine the PSFCH resource for the UE based on 1) PRB index of the PSCCH/PSSCH, 2) cyclic shift index, and 3) OCC/comb index. Accordingly, the UE 104, the RX processor 356, and/or the controller/processor 359 executing the sidelink reception component 140 and/or the signal processing component 148 may provide means for determining an association between PSSCH and PSCCH resources and a PSFCH resource based on the comb index.

At block 1220, the method 1200 includes receiving a first time domain signal for a sidelink signal during at least a portion of a first OFDM symbol. In an aspect, for example, the UE 104, the RX processor 356 and/or the controller/processor 359 may execute the sidelink reception component 140 and/or the partial symbol receiver component 142 to receive a first time domain signal for a sidelink signal during at least a portion of a first OFDM symbol. The first time domain signal includes a number of repetitions of a first waveform. Accordingly, the UE 104, the RX processor 356, and/or the controller/processor 359 executing the sidelink reception component 140 and/or the partial symbol receiver component 142 may provide means for receiving a first time domain signal for a sidelink signal during at least a portion of a first OFDM symbol.

At block 1230, the method 1200 includes performing automatic gain control on a first repetition of the first waveform. In an aspect, for example, the UE 104, the RX processor 356 and/or the controller/processor 359 may execute the sidelink reception component 140 and/or the AGC component 144 to perform automatic gain control on a first repetition of the first waveform. The first time domain signal includes a number of repetitions of a first waveform. For example, the first repetition of the first waveform may correspond to a first N/K samples of the time domain signal. In some implementations, the samples for AGC may follow a change of direction of the sidelink communications. For example, the AGC may be performed in the first half-symbol of the slot structure 600, 700 or in the first half-symbol following the gap 626, 726. In some implementations, the time domain signal 810 includes the CP 820. Although the CP 820 may be copied from a last repetition of the time domain signal 810, the CP 820 may correspond to CP samples 840 at an end of a first repetition of the first waveform. The AGC may stabilize the amplitude of the received signal such that samples in the subsequent repetition and subsequent symbols are more reliable. Accordingly, the UE 104, the RX processor 356, and/or the controller/processor 359 executing the sidelink reception component 140 and/or the AGC component 144 may provide means for performing automatic gain control on a first repetition of the first waveform.

At block 1240, the method 1200 includes performing a DFT on at least a portion of the first time domain signal. In an aspect, for example, the UE 104, the RX processor 356, and/or the controller/processor 359 may execute the sidelink reception component 140 and/or the DFT component 146 to perform a DFT on at least a portion of the first time domain signal. In some implementations, the DFT component 146 may perform the DFT on the samples of subsequent repetitions of the first waveform. In some implementations, at sub-block 1242, the block 1240 may optionally include duplicating a portion of the first time domain signal. For example, duplicating a subsequent repetition of the first dime domain signal may be used to fill a gap portion in the first symbol where the time domain signal was not transmitted. As another example, the duplicated repetition may be used to replace the first repetition of the waveform that is used for AGC. Duplicating a repetition of the waveform may result in a time domain signal including N samples for the symbol, and the DFT component 146 may utilize a DFT of size N. In some other implementations, the DFT component 146 may utilize a DFT based on a size of the received signal, which may be, for example, N/K when a single repetition is received or selected. Accordingly, the UE 104, the RX processor 356, and/or the controller/processor 359 executing the sidelink reception component 140 and/or the DFT component 146 may provide means for performing a DFT on at least a portion of the first time domain signal.

At block 1250, the method 1200 includes determining a transmitted signal or a channel from a subset of resource elements output from the DFT for a frequency domain allocation. In an aspect, for example, the UE 104, the RX processor 356 and/or the controller/processor 359 may execute the sidelink reception component 140 and/or the signal processing component 148 to determine a transmitted signal or a channel from a subset of resource elements output from the DFT for a frequency domain allocation. The subset of resource elements may be based on the number of repetitions of the first waveform. For example, the subset of resource elements may follow a comb pattern with values output on every $K^{th}$ resource element. As another example, where the size of the DFT is adapted based on the number of repetitions, the subset may include X/K resource elements, where X is the number of subcarriers in the frequency domain allocation. In some implementations, at sub-block 1252, the block 1250 may optionally include decoding one or more repetitions of the first waveform as the PSFCH, the PSCCH, or the PSSCH. In some implementations, at sub-block 1254, the block 1250 may optionally include estimating the channel based on a DMRS on the subset of resource elements. Accordingly, the UE 104, the RX processor 356, and/or the controller/processor 359 executing the sidelink reception component 140 and/or the signal processing component 148 may provide means for determining a transmitted signal or a channel from a subset of resource elements output from the DFT for a frequency domain allocation.

In some implementations, the method 1200 may include performing the method 1100 on a second OFDM symbol. For example, a receiving UE 1004 may perform the method 1200 on a first symbol of the slot structure 600 or 700 that includes PSCCH/PSSCH, then perform the method 1100 on a sixth symbol of the slot structure 600 or 700 that includes PSFCH.

The following provides an overview of aspects of the present disclosure:

Aspect 1: A method of wireless communication for a sidelink transmitting device, comprising: mapping a sidelink signal to a subset of resource elements in a frequency domain allocation defined via a comb for a first orthogonal frequency division multiplexing (OFDM) symbol; performing an inverse discrete Fourier transform (IDFT) on the resource elements to generate a first time domain signal, wherein the first time domain signal includes a number of repetitions of a first waveform based on a structure of the comb; and transmitting at least one repetition of the first waveform of the first time domain signal during at least a portion of the first OFDM symbol.

Aspect 2: The method of Aspect 1, wherein the sidelink signal is associated with one or more of a physical sidelink feedback channel (PSFCH), a physical sidelink control channel (PSCCH), or a physical sidelink shared channel (PSSCH).

Aspect 3: The method of Aspect 2, wherein a first repetition of the first waveform is for automatic gain control (AGC) and one or more subsequent repetitions of the first waveform during the first OFDM symbol are for the sidelink signal.

Aspect 4: The method of Aspect 3, further comprising transmitting at least a second OFDM symbol for the sidelink signal.

Aspect 5: The method of Aspect 3, wherein the one or more subsequent repetitions of the first waveform carry a demodulation reference signal (DMRS).

Aspect 6: The method of any of Aspects 1-5, further comprising inserting a cyclic prefix to the time domain signal before a first repetition of the first waveform.

Aspect 7: The method of any of Aspects 1-6, wherein the symbol includes a gap portion.

Aspect 8: The method of Aspect 7, wherein transmitting at least one repetition of the first waveform of the first time domain signal during at least the portion of the first OFDM symbol comprises transmitting the at least one repetition outside of the gap portion and zeroing a portion of the time domain signal during the gap portion.

Aspect 9: The method of Aspect 7, wherein transmitting at least one repetition of the waveform of the time domain signal during the first symbol comprises delaying the time domain signal by a length of the gap portion.

Aspect 10: The method of Aspect 7, wherein transmitting the at least one repetition of the first waveform of the first time domain signal during at least the portion of the first OFDM symbol, comprises increasing a transmission power of the at least one repetition of the first waveform based on a total transmission power allowed for the first OFDM symbol.

Aspect 11: The method of any of Aspects 1-10, wherein the comb allocates the sidelink signal to every $K^{th}$ resource element, where K is greater than or equal to 2.

Aspect 11a: The method of any of Aspects 1-10 wherein the comb has a comb-2 structure that allocates the sidelink signal to every other resource element.

Aspect 12: The method of Aspect 11, wherein sidelink transmissions for multiple UEs are multiplexed on the symbol using orthogonal cover codes (OCCs) of length K.

Aspect 13: The method of Aspect 12, wherein the OCCs have a same value in a first position and a last position.

Aspect 14: The method of any of Aspects 1-13, wherein an index of PSFCH resources is based at least in part on a comb index, further comprising determining an association between PSSCH and PSCCH resources and a PSFCH resource based on the comb index.

Aspect 15: The method of any of Aspects 1-14, further comprising: receiving a second time domain signal for a sidelink communication during at least a portion of a second OFDM symbol, wherein the second time domain signal includes a number of repetitions of a second waveform; performing automatic gain control on a first repetition of the second waveform; performing a discrete Fourier transform (DFT) on at least a portion of the second time domain signal; and determining transmitted bits or a channel from a subset of resource elements output from the DFT for a frequency domain allocation, wherein the subset of resource elements is based on the number of repetitions of the second waveform.

Aspect 16: A method of wireless communication for a sidelink receiving device, comprising: receiving a first time domain signal for a sidelink signal during at least a portion of a first orthogonal frequency domain multiplexing (OFDM) symbol, wherein the first time domain signal includes a number of repetitions of a first waveform; performing automatic gain control on a first repetition of the first waveform; performing a discrete Fourier transform (DFT) on at least a portion of the first time domain signal; and determining a transmitted signal or a channel from a subset of resource elements output from the DFT for a frequency domain allocation, wherein the subset of resource elements is based on the number of repetitions of the first waveform.

Aspect 17: The method of Aspect 16, wherein the sidelink signal is associated with one or more of a physical sidelink feedback channel (PSFCH), a physical sidelink control channel (PSCCH), or a physical sidelink shared channel (PSSCH).

Aspect 18: The method of Aspect 17, wherein determining the transmitted signal or the channel from the subset of resource elements output from the DFT for the frequency domain allocation comprises decoding one or more repetitions of the first waveform as the PSFCH, the PSCCH, or the PSSCH.

Aspect 19: The method of Aspect 17, wherein determining the transmitted signal or the channel from the subset of resource elements output from the DFT for the frequency domain allocation comprises estimating the channel based on a demodulation reference signal (DMRS) on the subset of resource elements.

Aspect 20: The method of any of Aspects 16-19, wherein the time domain signal includes a cyclic prefix before a first repetition of the first waveform.

Aspect 21: The method of any of Aspects 16-19, wherein the first symbol includes a gap portion.

Aspect 22: The method of Aspect 21, wherein performing the DFT on at least the portion of the first time domain signal comprises duplicating the portion of the first time domain signal.

Aspect 23: The method of any of Aspects 16-22, wherein the subset of resource elements has a comb-2 structure that outputs bits for the sidelink signal in every other resource element.

Aspect 24: The method of any of Aspects 16-22, wherein the subset of resource elements has bits for the sidelink signal in every $K^{th}$ resource element, where K is greater than 2.

Aspect 25: The method of Aspect 24, wherein sidelink transmissions for multiple UEs are multiplexed on the first symbol using orthogonal cover codes (OCCs) of length K.

Aspect 26: The method of Aspect 25, wherein the OCCs have a same value in a first position and a last position.

Aspect 27: The method of any of Aspects 16-26, wherein an index of PSFCH resources is based at least in part on a comb index, further comprising determining an association between PSSCH and PSCCH resources and a PSFCH resource based on the comb index.

Aspect 28: The method of any of Aspects 16-27, further comprising: mapping a sidelink signal to a subset of resource elements in a frequency domain allocation defined via a comb for a second OFDM symbol; performing an inverse discrete Fourier transform (IDFT) on the resource elements to generate a second time domain signal, wherein the second time domain signal includes a number of repetitions of a second waveform based on a structure of the comb; and transmitting at least one repetition of the second waveform of the second time domain signal during at least a portion of the second OFDM symbol.

Aspect 29: An apparatus for wireless communication, comprising: a transceiver; a memory storing computer-executable instructions; and a processor coupled with the transceiver and the memory and configured to execute the computer-executable instructions to perform the method of any of Aspects 1-28.

Aspect 30: An apparatus for wireless communication, comprising: means for performing the method of any of Aspects 1-28.

Aspect 31: A non-transitory computer-readable medium storing computer executable code, the code when executed by a processor causes the processor to perform the method of any of Aspects 1-28.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The invention claimed is:

1. An apparatus for wireless communication, comprising:
a transceiver;
a memory storing computer-executable instructions; and
at least one processor coupled with the transceiver and the memory and configured to execute the computer-executable instructions to:
map a sidelink signal to a subset of resource elements in a frequency domain allocation defined via a comb for a first orthogonal frequency division multiplexing (OFDM) symbol;
perform an inverse discrete Fourier transform (IDFT) on the resource elements to generate a first time domain signal, wherein the first time domain signal includes a number of repetitions of a first waveform based on a structure of the comb; and
transmit at least one repetition of the first waveform of the first time domain signal during at least a portion of the first OFDM symbol.

2. The apparatus of claim 1, wherein the sidelink signal is associated with one or more of a physical sidelink feedback channel (PSFCH), a physical sidelink control channel (PSCCH), or a physical sidelink shared channel (PSSCH).

3. The apparatus of claim 2, wherein a first repetition of the first waveform is for automatic gain control (AGC) and one or more subsequent repetitions of the first waveform during the first OFDM symbol are for the sidelink signal.

4. The apparatus of claim 3, wherein the at least one processor is configured to transmit at least a second OFDM symbol for the sidelink signal.

5. The apparatus of claim 3, wherein the one or more subsequent repetitions of the first waveform carry a demodulation reference signal (DMRS).

6. The apparatus of claim 1, wherein the at least one processor is configured to insert a cyclic prefix to the time domain signal before a first repetition of the first waveform.

7. The apparatus of claim 1, wherein the symbol includes a gap portion.

8. The apparatus of claim 7, wherein to transmit at least one repetition of the first waveform of the first time domain signal during at least the portion of the first OFDM symbol, the at least one processor is configured to transmit the at least one repetition outside of the gap portion and zero a portion of the time domain signal during the gap portion.

9. The apparatus of claim 7, wherein to transmit at least one repetition of the first waveform of the first time domain signal during at least the portion of the first OFDM symbol, the at least one processor is configured to delay the time domain signal by a length of the gap portion.

10. The apparatus of claim 7, wherein to transmit the at least one repetition of the first waveform of the first time domain signal during at least the portion of the first OFDM symbol, the at least one processor is configured to increase a transmission power of the at least one repetition of the first waveform based on a total transmission power allowed for the first OFDM symbol.

11. The apparatus of claim 1, wherein the comb allocates the sidelink signal to every Kth resource element, where K is greater than or equal to 2.

12. The apparatus of claim 11, wherein sidelink transmissions for multiple UEs are multiplexed on the symbol using orthogonal cover codes (OCCs) of length K.

13. The apparatus of claim 12, wherein the OCCs have a same value in a first position and a last position.

14. The apparatus of claim 1, wherein an index of PSFCH resources is based at least in part on a comb index, wherein the at least one processor is configured to determine an association between PSSCH and PSCCH resources and a PSFCH resource based on the comb index.

15. The apparatus of claim 1, wherein the at least one processor is configured to:
receive a second time domain signal for a sidelink communication during at least a portion of a second OFDM symbol, wherein the second time domain signal includes a number of repetitions of a second waveform;
perform automatic gain control on a first repetition of the second waveform;
perform a discrete Fourier transform (DFT) on at least a portion of the second time domain signal; and
determine transmitted bits or a channel from a subset of resource elements output from the DFT for a frequency domain allocation, wherein the subset of resource elements is based on the number of repetitions of the second waveform.

16. An apparatus for wireless communication, comprising:
- a transceiver;
- a memory storing computer-executable instructions; and
- at least one processor coupled with the transceiver and the memory and configured to execute the computer-executable instructions to:
    - receive a first time domain signal for a sidelink signal during at least a portion of a first orthogonal frequency domain multiplexing (OFDM) symbol, wherein the first time domain signal includes a number of repetitions of a first waveform;
    - perform automatic gain control on a first repetition of the first waveform;
    - perform a discrete Fourier transform (DFT) on at least a portion of the first time domain signal; and
    - determine a transmitted signal or a channel from a subset of resource elements output from the DFT for a frequency domain allocation, wherein the subset of resource elements is based on the number of repetitions of the first waveform.

17. The apparatus of claim 16, wherein the sidelink signal is associated with one or more of a physical sidelink feedback channel (PSFCH), a physical sidelink control channel (PSCCH), or a physical sidelink shared channel (PSSCH).

18. The apparatus of claim 17, wherein to determine the transmitted signal or the channel from the subset of resource elements output from the DFT for the frequency domain allocation, the at least one processor is configured to decode one or more repetitions of the first waveform as the PSFCH, the PSCCH, or the PSSCH.

19. The apparatus of claim 17, wherein to determine the transmitted signal or the channel from the subset of resource elements output from the DFT for the frequency domain allocation, the at least one processor is configured to estimate the channel based on a demodulation reference signal (DMRS) on the subset of resource elements.

20. The apparatus of claim 16, wherein the time domain signal includes a cyclic prefix before a first repetition of the first waveform.

21. The apparatus of claim 16, wherein the first symbol includes a gap portion.

22. The apparatus of claim 21, wherein to perform the DFT on at least the portion of the first time domain signal, the at least one processor is configured to duplicate the portion of the first time domain signal.

23. The apparatus of claim 16, wherein the subset of resource elements has a comb-2 structure that outputs bits for the sidelink signal in every other resource element.

24. The apparatus of claim 16, wherein the subset of resource elements has bits for the sidelink signal in every $K^{th}$ resource element, where K is greater than 2.

25. The apparatus of claim 24, wherein sidelink transmissions for multiple UEs are multiplexed on the first symbol using orthogonal cover codes (OCCs) of length K.

26. The apparatus of claim 25, wherein the OCCs have a same value in a first position and a last position.

27. The apparatus of claim 16, wherein an index of PSFCH resources is based at least in part on a comb index, further comprising determining an association between PSSCH and PSCCH resources and a PSFCH resource based on the comb index.

28. The apparatus of claim 16, wherein the at least one processor is configured to:
- map a sidelink signal to a subset of resource elements in a frequency domain allocation defined via a comb for a second OFDM symbol;
- perform an inverse discrete Fourier transform (IDFT) on the resource elements to generate a second time domain signal, wherein the second time domain signal includes a number of repetitions of a second waveform based on a structure of the comb; and
- transmit at least one repetition of the second waveform of the second time domain signal during at least a portion of the second OFDM symbol.

29. A method of wireless communication for a sidelink transmitting device, comprising:
- mapping a sidelink signal to a subset of resource elements in a frequency domain allocation defined via a comb for a first orthogonal frequency division multiplexing (OFDM) symbol;
- performing an inverse discrete Fourier transform (IDFT) on the resource elements to generate a first time domain signal, wherein the first time domain signal includes a number of repetitions of a first waveform based on a structure of the comb; and
- transmitting at least one repetition of the first waveform of the first time domain signal during at least a portion of the first OFDM symbol.

30. A method of wireless communication for a sidelink receiving device, comprising:
- receiving a first time domain signal for a sidelink signal during at least a portion of a first orthogonal frequency domain multiplexing (OFDM) symbol, wherein the first time domain signal includes a number of repetitions of a first waveform;
- performing automatic gain control on a first repetition of the first waveform;
- performing a discrete Fourier transform (DFT) on at least a portion of the first time domain signal; and
- determining a transmitted signal or a channel from a subset of resource elements output from the DFT for a frequency domain allocation, wherein the subset of resource elements is based on the number of repetitions of the first waveform.

* * * * *